(12) United States Patent
Mori

(10) Patent No.: US 8,400,669 B2
(45) Date of Patent: Mar. 19, 2013

(54) INFORMATION PROCESSING APPARATUS AND STAPLE ATTRIBUTE SETTING METHOD

(75) Inventor: Yasuo Mori, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 694 days.

(21) Appl. No.: 12/604,282

(22) Filed: Oct. 22, 2009

(65) Prior Publication Data

US 2010/0106721 A1 Apr. 29, 2010

(30) Foreign Application Priority Data

Oct. 24, 2008 (JP) ................. 2008-274891

(51) Int. Cl.
*G06K 15/00* (2006.01)
*G06F 3/12* (2006.01)
(52) U.S. Cl. ..................... 358/1.18; 358/1.13
(58) Field of Classification Search .......... None
See application file for complete search history.

(56) References Cited

U.S. PATENT DOCUMENTS

| 6,952,542 B1 | 10/2005 | Morikawa |
| 7,559,024 B2 | 7/2009 | Mori |
| 2005/0128500 A1* | 6/2005 | Nakagiri .................. 358/1.9 |

FOREIGN PATENT DOCUMENTS

| JP | 11-129586 A | 5/1999 |
| JP | 11-194667 A | 7/1999 |
| JP | 2003-9138 A | 1/2003 |
| JP | 2004-192248 A | 7/2004 |
| JP | 2007-008124 A | 1/2007 |

* cited by examiner

*Primary Examiner* — Dov Popovici
(74) *Attorney, Agent, or Firm* — Canon USA Inc IP Division

(57) ABSTRACT

An information processing apparatus includes an attribute setting unit configured to set a continuous staple attribute as chapter information of document data having a hierarchical structure that includes document information, chapter information, and page information, based on a user's setting entered via a screen, wherein the continuous staple attribute is set to instruct a printing apparatus to staple consecutive chapters together as a group.

11 Claims, 29 Drawing Sheets

FIG.4

| NO | ATTRIBUTE INFORMATION | | APPLICATION |
|---|---|---|---|
| 1 | PRINT METHOD | ONE-SIDED/TWO-SIDED/ BOOKBINDING PRINTING | |
| 2 | PAPER SIZE | ORIGINAL SIZE/ FIXED SIZE | · DESIGNATE Z-FOLDING WHEN "A4+A3", "B4+B3", AND "LETTER+ LEDGER (11x17)" IS DESIGNATED<br>· AUTOMATICALLY SELECT ORIGINAL SIZE OF CHAPTER 1/PAGE 1 WHEN BOOKBINDING PRINT OR N-UP PRINT IS DESIGNATED |
| 3 | PAPER ORIENTATION | PORTRAIT/ LANDSCAPE | · SELECTABLE ONLY FOR FIXED SIZE |
| 4 | BINDING MARGIN/ BINDING DIRECTION | | · SHIFT/ENLARGE-REDUCE DESIGNATION IS FEASIBLE |
| 5 | N-UP PRINT | PAGE NUMBER/ PLACEMENT ORDER/ BORDER LINE/ PLACEMENT POSITION | · 9 PATTERNS ARE AVAILABLE IN PLACEMENT POSITION<br>· DIRECT PRINT DESIGNATION IS FEASIBLE |
| 6 | ENLARGE/REDUCE | ON/OFF | · AUTOMATICALLY DESIGNATE ON OR OFF WHEN FIXED PAPER SIZE OR N-UP PRINT IS SELECTED |
| 7 | WATERMARK | | · INDEPENDENTLY DESIGNATABLE FOR EACH LOGICAL PAGE AND PHYSICAL PAGE<br>· APPLICABLE TO ALL CHAPTERS/ALL PAGES |
| 8 | HEADER/FOOTER | | · INDEPENDENTLY DESIGNATABLE FOR EACH LOGICAL PAGE AND PHYSICAL PAGE<br>· APPLICABLE TO ALL CHAPTERS/ALL PAGES |
| 9 | PAPER DISCHARGE METHOD | STAPLE/ PUNCH HOLE | · STAPLE/PUNCH IS AVAILABLE FOR ONE-SIDED/TWO-SIDED PRINTING<br>· STAPLE IS 1 PORTION OR 2 PORTIONS |
| 10 | BOOKBINDING DETAILS | OPENING DIRECTION/ SADDLE STITCH/ ENLARGE-REDUCE DESIGNATION/ BINDING MARGIN/ SEPARATE VOLUME | · ONLY AVAILABLE FOR BOOKBINDING PRINTING |
| 11 | FRONT COVER/ BACK COVER | | · DESIGNATE PRINTING OF FRONT COVER 1/2 AND BACK COVER 1/2<br>· DESIGNATE PAPER FEED PORT (INCLUDING INSERTER) |
| 12 | INDEX SHEET | | · CHARACTER STRING PRINTING TO INDEX PORTION AND ANNOTATION ON INDEX SHEET ARE SETTABLE<br>· UNDESIGNATABLE FOR BOOKBINDING PRINTING |
| 13 | INTERLEAF | | · DESIGNATE PAPER FEED PORT (INCLUDING INSERTER)<br>· PRINTING OF ORIGINAL DATA ON INSERTED SHEET IS FEASIBLE<br>· UNDESIGNATABLE FOR BOOKBINDING PRINT |
| 14 | CHAPTER BREAK | "NO BREAK"/ "PAGE BREAK"/ "PAPER BREAK" | · FIXED TO "PAPER BREAK" WHEN INDEX SHEET OR INTERLEAF IS DESIGNATED<br>· FIXED TO "PAPER BREAK" FOR ONE-SIDED PRINTING |

FIG.5

| NO | ATTRIBUTE INFORMATION | | APPLICATION |
|---|---|---|---|
| 1 | PAPER SIZE | ORIGINAL SIZE/ FIXED SIZE | · AUTOMATICALLY DESIGNATE "PAPER BREAK" WHEN FIXED SIZE IS SELECTED<br>· CHANGEABLE FOR ONLY DESIGNATED PAPER WHEN PLURAL TYPES OF PAPER ARE SELECTED IN BOOK, AND CHANGE OF PAPER SIZE IS FEASIBLE FOR DESIGNATION OF BOOK ADJUSTMENT |
| 2 | PAPER ORIENTATION | PORTRAIT/ LANDSCAPE | · SELECTABLE ONLY FOR FIXED SIZE |
| 3 | N-UP PRINT DESIGNATION | PAGE NUMBER/ PLACEMENT ORDER/ BORDER LINE/ PLACEMENT POSITION | · 9 PATTERNS ARE AVAILABLE IN PLACEMENT POSITION<br>· DIRECT PRINT DESIGNATION IS FEASIBLE |
| 4 | ENLARGE/ REDUCE | ON/OFF | · AUTOMATICALLY DESIGNATE ON OR OFF WHEN FIXED PAPER SIZE OR N-UP PRINT IS SELECTED |
| 5 | WATERMARK | DISPLAY/ NON-DISPLAY | · DETERMINE WHETHER TO DISPLAY ALL WATERMARKS DESIGNATED BY BOOK |
| 6 | HEADER /FOOTER | DISPLAY/ NON-DISPLAY | · DETERMINE WHETHER TO DISPLAY ALL HEADERS/FOOTERS DESIGNATED BY BOOK |
| 7 | PAPER DISCHARGE METHOD | STAPLE | · "OFF" IS SELECTABLE WHEN STAPLE IS DESIGNATED BY BOOK. DEFAULT SETTING IS "ON" |

FIG.6

| NO | ATTRIBUTE INFORMATION | | APPLICATION |
|---|---|---|---|
| 1 | PAGE ROTATION DESIGNATION | | · SELECTABLE FROM 0/90/180/270 DEGREES |
| 2 | WATERMARK | DISPLAY/ NON-DISPLAY | · DETERMINE WHETHER TO DISPLAY ALL WATERMARKS DESIGNATED BY BOOK |
| 3 | HEADER/ FOOTER | DISPLAY/ NON-DISPLAY | · DETERMINE WHETHER TO DISPLAY ALL HEADERS/FOOTERS DESIGNATED BY BOOK |
| 4 | ZOOM | 50% - 200% | · DESIGNATE RELATIVE MAGNIFICATION WHEN 100% SIZE IS EQUAL TO VIRTUAL LOGICAL PAGE REGION |
| 5 | PLACEMENT POSITION | | · SELECT ONE OF NINE FIXED PATTERNS OR ARBITRARY POSITION |
| 6 | ANNOTATION | | |
| 7 | VARIABLE ITEM | | |
| 8 | PAGE DIVISION | | |

INFORMATION PROCESSING APPARATUS AND STAPLE ATTRIBUTE SETTING METHOD

BACKGROUND OF THE INVENTION

1. Field of the Invention

The present invention relates to an information processing apparatus and a staple attribute setting method.

2. Description of the Related Art

An information processing apparatus, such as a personal computer, enables users to instruct a printing apparatus (a printer or a copying machine) to print an edited document to obtain a plurality of individually stapled copies. A document processing system enables users to determine whether to staple the entire document of a print job and designate a range of the document to be stapled.

The above-described system enables users to divide a document into a plurality of portions (each referred to as a chapter) and set a partial staple instruction (i.e., a partial staple instruction attribute) that instructs whether to staple or not for each chapter. Further, the above-described system can be combined with a print processing apparatus that can generate print data according to the set partial staple instruction and can perform staple processing based on the print data, as discussed in Japanese Patent Application Laid-Open No. 2003-9138.

As discussed in Japanese Patent Application Laid-Open No. 2003-9138, there is a conventional method for partial staple ON setting or a conventional method for setting a partial staple for the print processing apparatus. As discussed in Japanese Patent Application Laid-Open No. 11-194667, there is a conventional method for improving visibility when the above-described setting of data having a hierarchical structure.

As discussed in Japanese Patent Application Laid-Open No. 2004-192248, when a document processing system handles a document including a plurality of chapters that are arranged in a hierarchical structure, the document processing system can generate a new chapter by dividing one of the plurality of chapters and can set an attribute for the newly generated chapter to be identical to that of the original chapter having been divided. In this case, operability can be improved.

According to the above-described system, it may be necessary to divide a chapter to change any one of various settings including the staple. For example, to change a print mode from one-sided printing to two-sided printing, the system generates a one-sided printing chapter and a two-sided printing chapter and then sets a one-sided printing attribute and a two-sided printing attribute for the generated chapters, respectively.

Therefore, although it is desired to staple all the chapters as a group, the one-sided printing chapter and the two-sided printing chapter cannot be assembled together. Thus, the system staples a one-sided printing portion and a two-sided printing portion individually. Moreover, things that the system can perform when a new chapter is generated are limited to simply copying an attribute of the original chapter and setting a default value.

SUMMARY OF THE INVENTION

The present invention is directed to an information processing apparatus capable of promptly setting a staple attribute that instructs a printing apparatus to staple consecutive chapters as a group, and is further directed to a method for setting the staple attribute.

According to an aspect of the present invention, an information processing apparatus includes an attribute setting unit configured to set a continuous staple attribute as chapter information of document data having a hierarchical structure that includes document information, chapter information, and page information, based on a user's setting entered via a screen, wherein the continuous staple attribute is set to instruct a printing apparatus to staple consecutive chapters together as a group.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an example of book attributes (i.e., document setting information) according to an exemplary embodiment of the present invention.

FIG. 5 illustrates an example of chapter attributes (i.e., chapter setting information) according to an exemplary embodiment of the present invention.

FIG. 6 illustrates an example of page attributes (i.e., page setting information) according to an exemplary embodiment of the present invention.

DESCRIPTION OF THE EMBODIMENTS

Various exemplary embodiments, features, and aspects of the invention will be described in detail below with reference to the drawings.

A document processing system according to an exemplary embodiment of the present invention includes an electronic original writer that can convert a data file generated by a general application into an electronic original file. A bookbinding application can provide a function for editing the electronic original file.

The general application, the electronic original writer, the bookbinding application, and an electronic original despooler have mutually different functions and are explicitly discriminated in the present exemplary embodiment. However, software packages available for the users are not limited to the above-described applications. For example, a combined application or a graphic engine can be also available.

Figure 1:
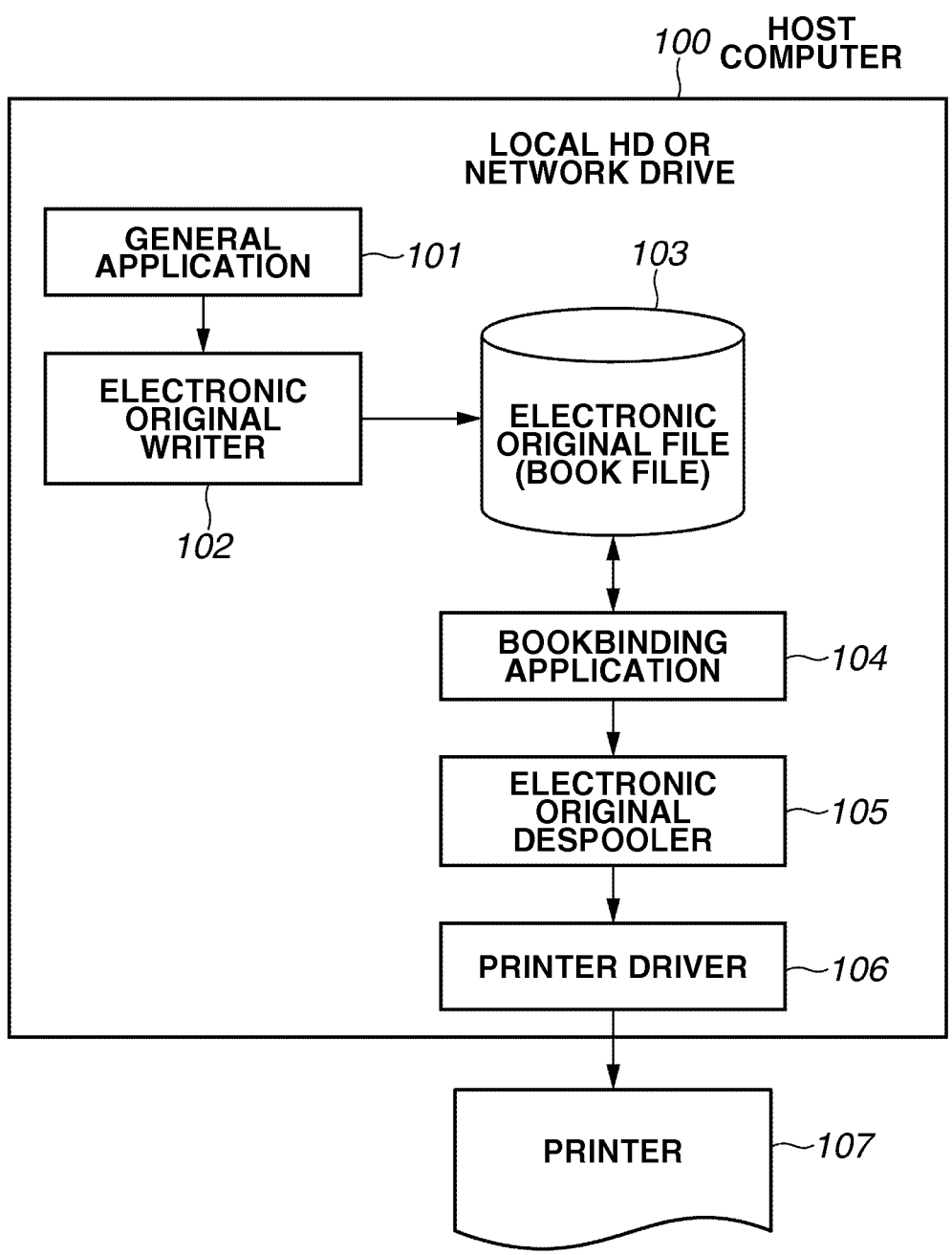
FIG. 1 illustrates an example of a software configuration of a document processing system according to an exemplary embodiment of the present invention.

FIG. 1 illustrates an example of a software configuration of a document processing system according to an exemplary embodiment of the present invention. The document processing system can be realized by a digital computer 100 (hereinafter, referred to as a host computer), which is an exemplary embodiment of a document processing apparatus (i.e., an information processing apparatus).

A general application 101 is an application program that may provide various functions, such as, word processing, spreadsheet, photo retouch, draw or paint, presentation, and text editing. The general application 101 may also have a print function for an operating system (OS).

When a user instructs printing of generated application data, such as document data and image data, the general application 101 may use a predetermined interface (generally, referred to as a "graphic device interface (GDI)") provided by the OS.

More specifically, to print generated data, the general application 101 can transmit an output command (which is referred to as a "GDI function") having a predetermined OS-dependent format to an output module of the OS that provides the above-described interface.

The output module receives the output command and converts the received output command into data having a format that can be processed by a printer or other output device. The output module outputs a converted command (referred to as a device driver interface (DDI) function). The format that the output device can process is dependent on the type of each device, each manufacturer, and machine model. The OS converts the command using a device driver, generates print data, and generates a print job using a job language (JL).

When the OS is Windows® provided by Microsoft Corporation, the above-described output module is referred to as a graphic device interface (GDI).

An electronic original writer 102, which is an improved type of the above-described device driver, can serve as a software module that can realize a document processing system according to the present embodiment. The electronic original writer 102 is not dedicated to a specific output device, and performs conversion of data into an output command having a predetermined format so that a bookbinding application 104 or a printer driver 106 can process the output command.

The converted format obtained by the electronic original writer 102 (hereinafter, referred to as an "electronic original format") can be any format that can express original data on a page-by-page basis. For example, Portable Document Format (PDF) format provided by Adobe Systems or Scalable Vector Graphics (SVG) format can be used as a standard electronic original format.

In one version, when the general application 101 uses the electronic original writer 102, the general application 101 may designate the electronic original writer 102 as an output device driver before instructing print processing.

In general, an electronic original file generated by the electronic original writer 102 does not have perfect format as an electronic original file. Therefore, the bookbinding application 104 may designate the electronic original writer 102 as a device driver.

The bookbinding application 104 can manage the conversion of application data into an electronic original file. According to one embodiment, the bookbinding application 104 then completes an electronic original file so as to have a below-described format based on an incomplete electronic original file newly generated by the electronic original writer 102.

In the following description, to explicitly express the above-described features, a file generated by the electronic original writer 102 may be referred to as an "electronic original file" and an electronic original file having been completed by the bookbinding application 104 may be referred to as a "book file." If files are not specifically designated, then document files, electronic original files, and book files generated by an application may be simply referred to as document files (or document data).

As described above, when the electronic original writer 102 is designated as a device driver and the general application 101 generates print data, application data can be converted into an electronic original format including pages (hereinafter, referred to as "logical pages" or "original pages") defined by the general application 101. The converted application data can be stored as an electronic original file 103 into a hard disk or other storage medium.

The hard disk can be, for example, a local drive of the computer that realizes the document processing system of the present exemplary embodiment, or can be a network drive connected to a network.

In one embodiment, the bookbinding application 104 may read the electronic original file or book file (or book file) 103 and enables users to edit the read file. However, the bookbinding application 104 may not provide any function for editing the content of each page. In one version, the bookbinding application 104 enables users to edit the structure of a book or a chapter on a page-by-page basis.

When a user instructs printing of the book file 103 edited by the bookbinding application 104, the bookbinding application 104 activates an electronic original despooler 105. The electronic original despooler 105 may be a program module to be installed on the computer together with the bookbinding application 104.

The electronic original despooler 105 is a module that can be used to output drawing data to the printer driver 106, when a document (book file) to be used by the bookbinding application 104 is printed.

In one version, the electronic original despooler 105 reads a designated book file from the hard disk, and generates an output command adaptable to the above-described output module of the OS so as to print each page according to a format described in the book file. The electronic original despooler 105 outputs the generated command to the output module (not illustrated).

In this case, the electronic original despooler 105 designates the printer driver 106 as a device driver for a printer 107 used as an output device. The output module converts the output command into a device command and outputs the device command to the printer driver 106 to be used by the designated printer 107. Then, the printer driver 106 transmits the converted device command to the printer 107. The printer 107 prints an image based on the command.

Figure 2:
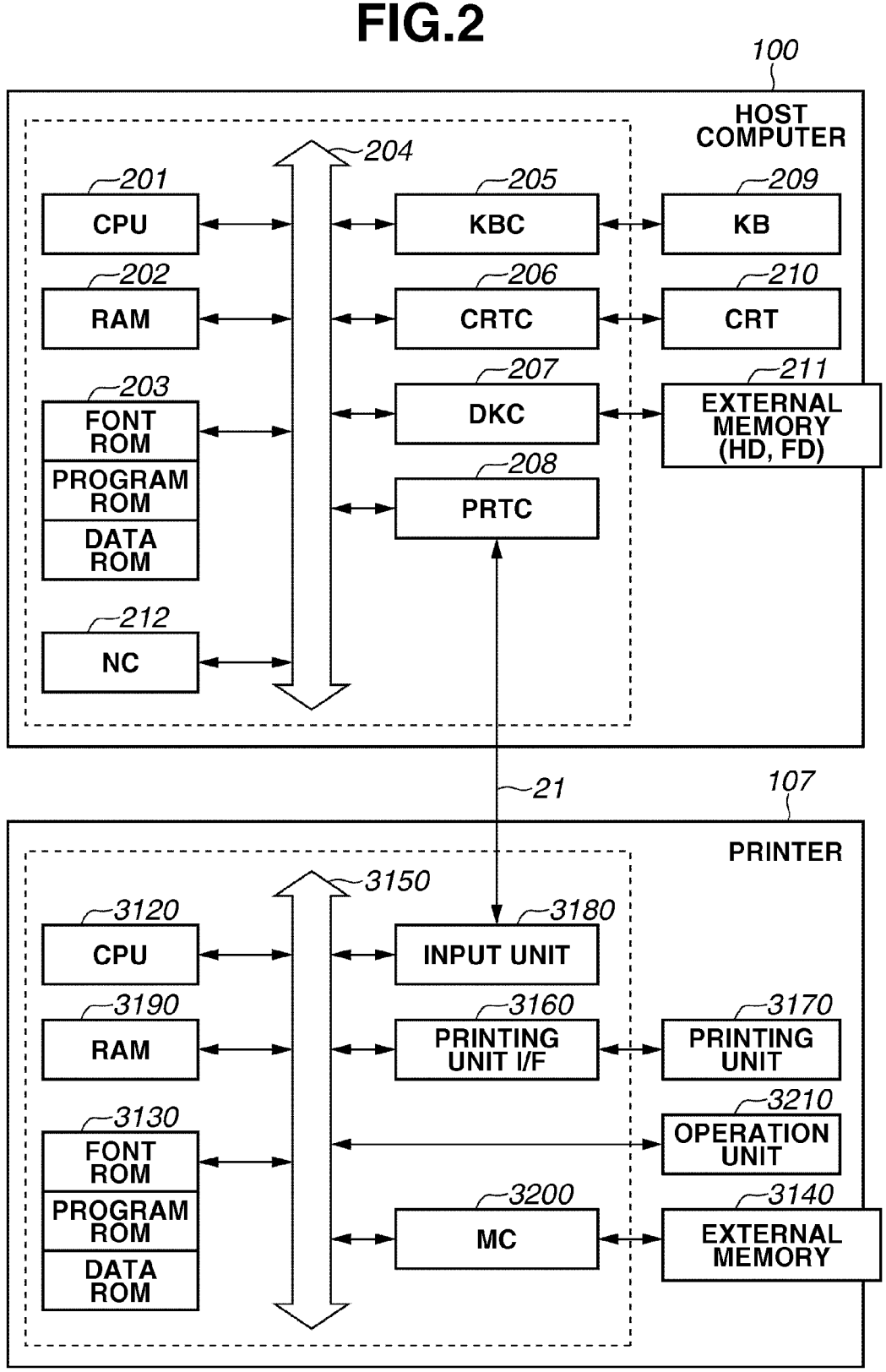
FIG. 2 illustrates an example of a hardware configuration of the document processing system according to an exemplary embodiment of the present invention.

FIG. 2 is a block diagram illustrating an example of a hardware configuration of the document processing system according to an exemplary embodiment of the present invention. In the embodiment illustrated in FIG. 2, the host computer 100 includes a central processing unit (CPU) 201 that can execute various processing on documents including graphics, images, texts, tables (including spreadsheets) based on document processing programs stored in a program read only memory (ROM) area of a ROM 203 or in an external memory 211. The CPU 201 can integrally control various devices connected to a system bus 204.

An operating system program for controlling the CPU 201 can be stored in the program ROM area of the ROM 203 or in the external memory 211. Font data to be used in the above-described document processing can be stored in a font ROM of the ROM 203 or in the external memory 211. Various data to be used in the above-described document processing can be stored in a data ROM of the ROM 203 or in the external memory 211. The RAM 202 is capable of functioning as a main memory and a work area for the CPU 201.

A keyboard controller (KBC) 205 controls any key input that may be entered via a keyboard 209 or a pointing device (not illustrated). A cathode ray tube (CRT) controller (CRTC) 206 controls a cathode ray tube (CRT) display (CRT) 210. A disk controller (DKC) 207 controls any access to the external memory 211, such as a hard disk (HD) or a floppy disk (FD). The external memory 211 can store, for example, at least one of a boot program, various applications, font data, user files, editing files, and printer control command generation programs (i.e., printer drivers).

A printer controller (PRTC) 208 is connected to the printer 107 via a bidirectional interface (interface) 21. The PRTC 208 controls signals sent to or received from the connected printer 107. A network controller (NC) 212, connected to a network, executes communication control processing when the host computer 100 communicates with other devices connected to the network.

The CPU 201 can, for example, execute processing for rasterizing outline fonts on a display information RAM that is set on the RAM 202, to realize "what you see is what you get" (WYSIWYG) function on the CRT 210.

The CPU 201 can open various windows that are registered beforehand according to commands instructed by a user using a mouse cursor (not illustrated) displayed on the CRT 210. The CPU 201 can execute various types of data processing. For example, when a user instructs execution of printing, the CPU 201 opens the registered windows and allows the user to perform print settings, printer settings, print mode selection, and other print processing settings relating to a printer driver.

The printer 107 includes a CPU 3120, which can execute control programs loaded from a program ROM area of a ROM 3130 and an external memory 3140. The CPU 3120 outputs an image signal, as output information, to a printing unit (i.e., a printer engine) 3170 via a printing unit I/F 3160 connected to a system bus 3150.

The program ROM area of the ROM 3130 stores the control programs of the CPU 3120. A font ROM area of the ROM 3130 stores font data to be used when the above-described output information is generated. A data ROM area of the ROM 3130 may store information to be used by the host computer 100 if the printer does not use the external memory 3140 (e.g., a hard disk).

The CPU 3120 can communicate with the host computer 100 via an input unit 3180, for example, to notify the host computer 100 of information of the printer 107. The printer 107 includes a RAM 3190, which can function as a main memory or a work area for the CPU 3120.

The printer 107 has an expansion port (not illustrated) to which an optional RAM can be connected to increase the memory capacity. The RAM 3190 can be used as an output information expansion area, an environmental data storage area, or a non-volatile random access memory (NVRAM). A memory controller (MC) 20 controls every access to the above-described external memory 3140, such as a hard disk (HD) or an IC card.

The external memory 3140 is connectable as an optional device and usable as a storage device for font data, emulation programs, and form data. An operation unit 3210 includes various operation switches and a light-emitting diode (LED) display device. The above-described external memory 3140 is not limited to a single memory unit and can be a plurality of memory units which, for example, store programs capable of interpreting languages of an optional card or control languages of a different printer in addition to built-in fonts. The external memory 3140 can include an NVRAM (not illustrated), which stores printer mode setting information entered via the operation unit 3210.

Prior to a detailed description of the bookbinding application 104, an example data format of the above-described "book file" is described below. The book file has a three-layer structure resembling a book composed of papers.

An upper layer is referred to as a "book" resembling a single book, which can define an attribute relating to the entire book. An intermediate layer, subordinated to the upper layer, is referred to as a "chapter" that corresponds to a chapter of the book.

Each "chapter" can define an attribute of each chapter. A lower layer is referred to as a "page" that corresponds to each page defined by an application program. Each "page" can define an attribute of each page. One "book" can include a plurality of "chapters." One "chapter" can include a plurality of "pages."

Figure 3:
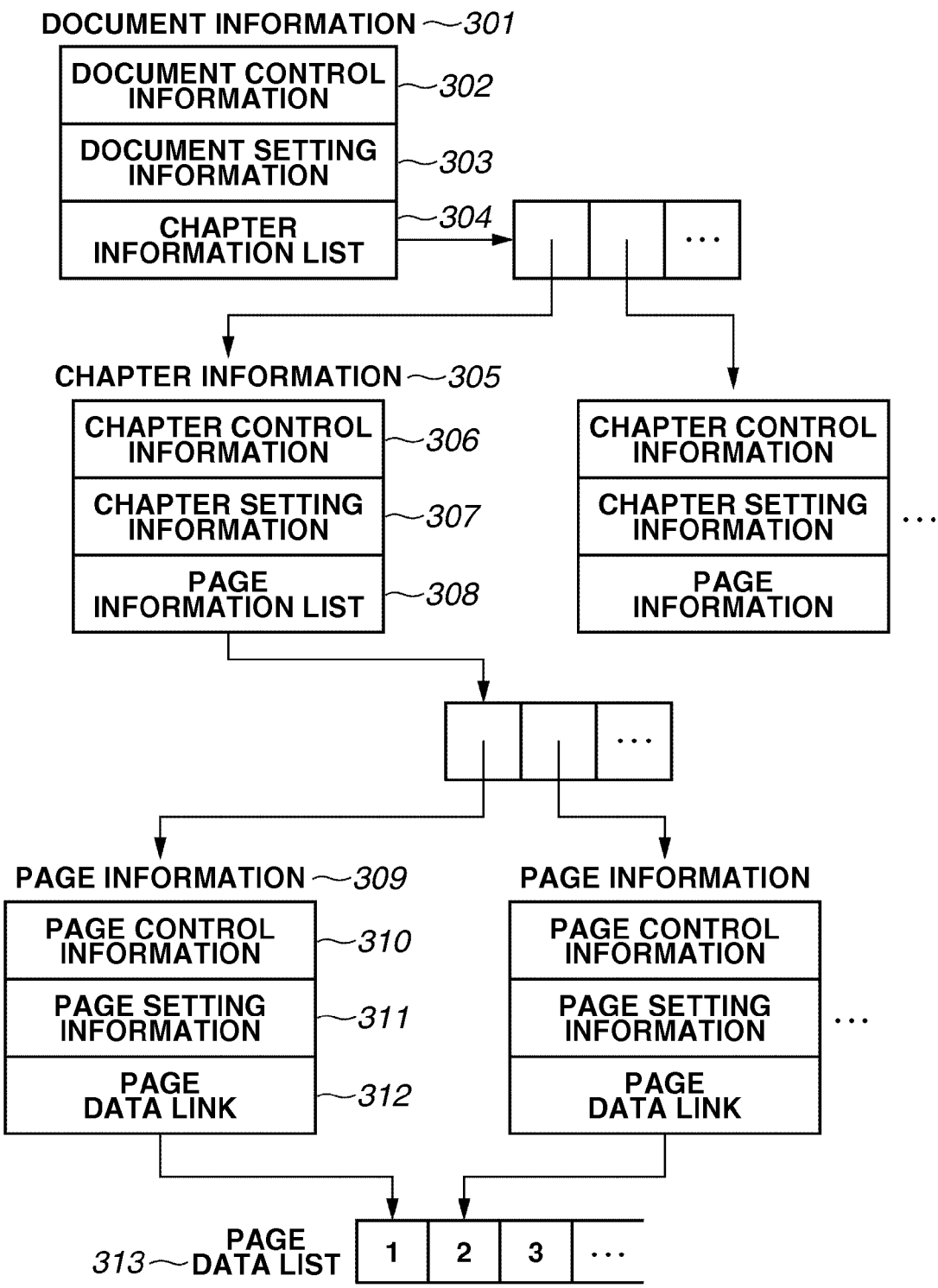
FIG. 3 schematically illustrates an example of a format of a book file according to an exemplary embodiment of the present invention.

FIG. 3 illustrates an example of a format of the book file including a book, chapters, and pages denoted by corresponding nodes according to the present exemplary embodiment.

One book file includes one "book." Both the "book" and the "chapter" are the concept that defines a book structure (i.e., a hierarchical structure) and includes defined attribute values and a link to a lower layer as its entity.

The "page" includes data for each page generated by the application program as its entity. Therefore, the "page" includes the entity of an original page (i.e., original page data) and a link to each original page data, in addition to its attribute values.

A print page output to a paper medium may include a plurality of original pages. The structure of each print page is not displayed with a link and displayed as part of the attributes for the "book", the "chapter", or the "page." In FIG. 3, the book file does not need to be one complete book. Therefore, the "book" is generally referred to as a "document."

The uppermost-layer of the hierarchical structure is document information 301. The document information 301 is roughly classified into three parts 302 to 304. The document control information 302 stores a path name and other information in a document file system. The document setting information 303 stores layout information (e.g., a page layout) and staple and other function setting information of the printing apparatus (i.e., the printer 107). The document setting information 303 corresponds to book attributes. The chapter information list 304 has a list format as an assembly of chapters that configure a document. The list stores chapter information 305.

The chapter information 305 is roughly classified into three parts 306 to 308. The chapter control information 306 stores a chapter name and other information. The chapter setting information 307 stores a chapter unique page layout and staple information. The chapter setting information 307 corresponds to the chapter attributes. When each chapter has unique setting information, a document having a complicated layout (e.g., 2-UP layout for the initial chapter and 4-UP layout for other chapters) can be generated. The page information list 308 has a list format as an assembly of original pages that configure each chapter. The page information list 308 instructs page information 309.

The page information 309 is roughly classified into three parts 310 to 312. The page control information 310 stores page number information to be displayed on a tree. The page setting information 311 stores a page rotational angle and page layout position information. The page setting information 311 corresponds to the original page attributes. The page data link 312 is original data corresponding to a page. According to the example illustrated in FIG. 3, the page information 309 does not store the original data itself and stores the page data link 312 only. A page data list 313 stores actual original data.

FIG. 4 illustrates an example of the book attributes (i.e., document setting information 303). An item, if defined in both upper and lower layers, describes its effective attribute value in the lower layer. Therefore, an item involved only in the book attributes has an attribute value that is valid in the entire book.

However, an item defined in both the book attributes and a lower layer has a valid content being set for the book attributes. In the example illustrated in FIG. 4, each item may not correspond to a single item and may include a plurality of relevant items.

As is apparent from FIGS. 4 to 6, a total of seven items of "print method", "binding margin/binding direction", "bookbinding details", "front cover/back cover", "index sheet", "interleaf", and "chapter break" are items unique to the book attributes and defined as valid throughout the book. The "print method" attribute enables users to designate, as a print method, "one-sided printing", "two-sided printing", or "bookbinding printing."

The "bookbinding printing" is a predetermined print method prepared beforehand to form a book through sequential processes including bundling a designated number of sheets, folding the sheets, and stitching the sheets. The "bookbinding details" attribute enables users to designate "opening direction", "total number of bundled sheets", or the like when the user selects the bookbinding printing.

The "front cover/back cover" attribute enables users to add a front cover and a back cover for an electronic original file to be printed as a book and designate print contents on the added covers. The "index sheet" attribute enables users to designate an insertion of an eared index sheet, as a break of a chapter, which can be separately prepared for a printing apparatus and also enables users to designate print contents on the index eared portions.

The "index sheet" attribute may be valid for a printing apparatus equipped with an inserter function that can insert a specifically provided sheet into a desired position of the printed sheet. The "index sheet" attribute may also be valid when a printer has a plurality of paper feeding cassettes. The same thing may be applied to the "interleaf" attribute.

The "interleaf" attribute enables users to designate, as a break of a chapter, insertion of a sheet supplied by an inserter or from a paper feed cassette and, if an interleaf is inserted, designate a paper feeding source. The "chapter break" attribute enables users to designate the usage of a new paper or the usage of a new print page at a breakpoint of the chapter.

When a user selects the "one-sided printing", usage of a new paper and usage of a new print page are not different in the meaning. If a user designates the "usage of a new paper" in the two-sided printing, consecutive chapters are not printed on the same paper. On the other hand, if a user designates the "usage of a new print page", consecutive chapters can be printed on front and back surfaces of a paper.

FIG. 5 illustrates an example of chapter attributes (i.e., chapter setting information 307). FIG. 6 illustrates an example of page attributes (page setting information 311). The relationship between the chapter attributes and the page attributes is similar to the relationship between the book attributes and lower layer attributes.

The chapter attributes illustrated in FIG. 5 do not include any item(s) unique to the chapter. All of the chapter attributes are involved in the book attributes. Therefore, if definitions in the chapter attributes disagree with definitions in the book attributes, the values defined in the chapter attribute are prioritized over the values defined in the book attributes.

However, as described below, the present exemplary embodiment enables users to determine whether to prioritize lower-layer attribute values over upper-layer attribute values.

Five items of "paper size", "paper orientation", "N-up print designation", "enlarge/reduce", and "paper discharge method" are items commonly included in the book attributes and the chapter attributes. The "N-up print designation" attribute is an item enabling users to designate the number of original pages on a piece of printed paper. For example, a user can select a page layout selected from the group including 1×1, 1×2, 2×2, 3×3, and 4×4.

The "paper discharge method" attribute is an item enabling users to determine whether staple processing for discharged sheets is performed, although the "paper discharge method" attribute may be valid for a printing apparatus having a stapling function.

In FIG. 6, five items of "page rotation designation", "zoom", "placement position", "annotation", and "page division" are items unique to the page attributes. The "page rotation designation" attribute is an item enabling users to designate a rotational angle of an original page to be disposed on a print page. The "zoom" attribute is an item enabling users to designate a zoom ratio of an original page. The zoom ratio defines a size relative to a virtual logical page region (i.e., 100%). The virtual logical page region is a region occupied by one original page when the original page is disposed according to an N-up designation.

For example, if the selected page layout is 1×1, the virtual logical page region is a region corresponding to one printed page. If the selected page layout is 1×2, the virtual logical page region is a reduced region having each side equivalent to approximately 70% of a corresponding side of one printed page.

Two attribute items "watermark" and "header/footer" are commonly included in the "book", "chapter", and "page" attributes. The "watermark" attribute is an image or a character string which can be superposed on print data generated by an application. The "header/footer" attribute is information in a top margin and/or a bottom margin to be printed on each page. The "header/footer" can include any parameters, such as page number and date/time, which are variable.

The contents designated in the "watermark" attribute and the "header/footer" attribute are similarly defined in the chapter attributes and the page attributes. The "book" attributes are different from the "chapter" attributes and the "page" attributes. The "book" attributes can define the contents of the "watermark" and the "header/footer" and also designate print methods of the "watermark" and the "header/footer" throughout the book.

On the other hand, the "chapter" attributes and the "page" attributes can determine whether the "watermark" and the "header/footer" defined in the book attributes are applied to each "chapter" or each "page."

Figure 7:
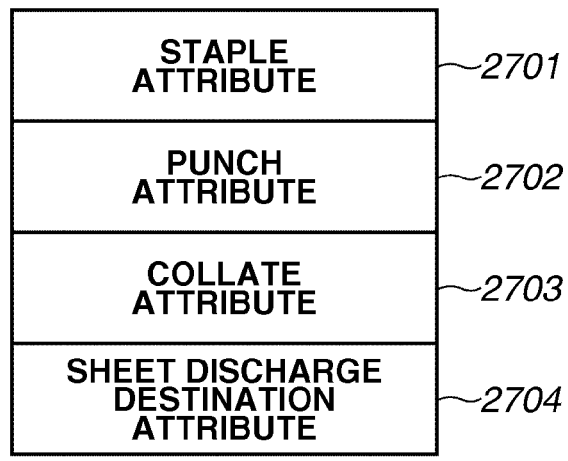
FIG. 7 illustrates an example of a detailed format of a sheet discharge attribute included in the book attributes (i.e., document setting information) illustrated in FIG. 4 according to an exemplary embodiment of the present invention.

FIG. 7 illustrates an example of a detailed format of the sheet discharge attribute included in the book attribute (document setting information 303) illustrated in FIG. 4. The sheet discharge attribute includes a staple attribute 2701, a punch attribute 2702, a collate attribute 2703, and a sheet discharge destination attribute 2704.

The staple attribute 2701 can be one of three attribute values "staple OFF", "group staple", and "staple by chapter." If the staple ON is selected, the staple position attribute (upper right (single), right edge (double), and lower right (single), etc.) can be further added.

The punch attribute 2702 can be selected from two attribute values "punch on" and "punch off". If the punch is selected, a required number of punches can be added as a sub attribute. The collate attribute 2703 can be selected from two attribute values "print by set" and "print according to same page order." The sheet discharge destination attribute 2704 includes an ID of a sheet discharge port that designates the sheet discharge port.

Figure 8:
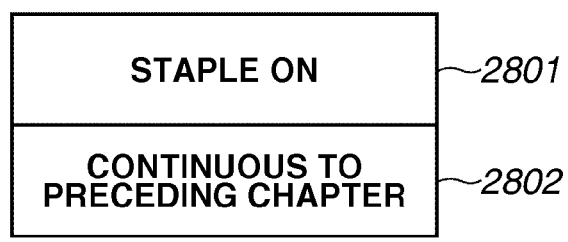
FIG. 8 illustrates an example of a data structure of a staple attribute included in a sheet discharge destination attribute of a chapter attribute (i.e., chapter setting information) according to an exemplary embodiment of the present invention.

FIG. 8 illustrates an example of a data structure of the staple attribute 2701 included in the sheet discharge destination attribute 2704 of the chapter attribute (i.e., chapter setting information 307). The staple attribute 2701 corresponds to check boxes 1302 and 1303 relating to the staple illustrated in FIG. 15.

The staple attribute 2701 includes a staple attribute 2801 that stores a setting value selected between "staple ON" and "staple off." The staple attribute 2701 further includes a staple continuation attribute 2802 that stores a setting value selected between "continuous to preceding chapter" and "not continuous to preceding chapter."

The book file has the above-described structure and contents. The bookbinding application 104 and the electronic original writer 102 can generate (create) a book file according to the following procedure. The bookbinding application 104 can realize book file generation as apart of a book file editing operation.

Figure 9:
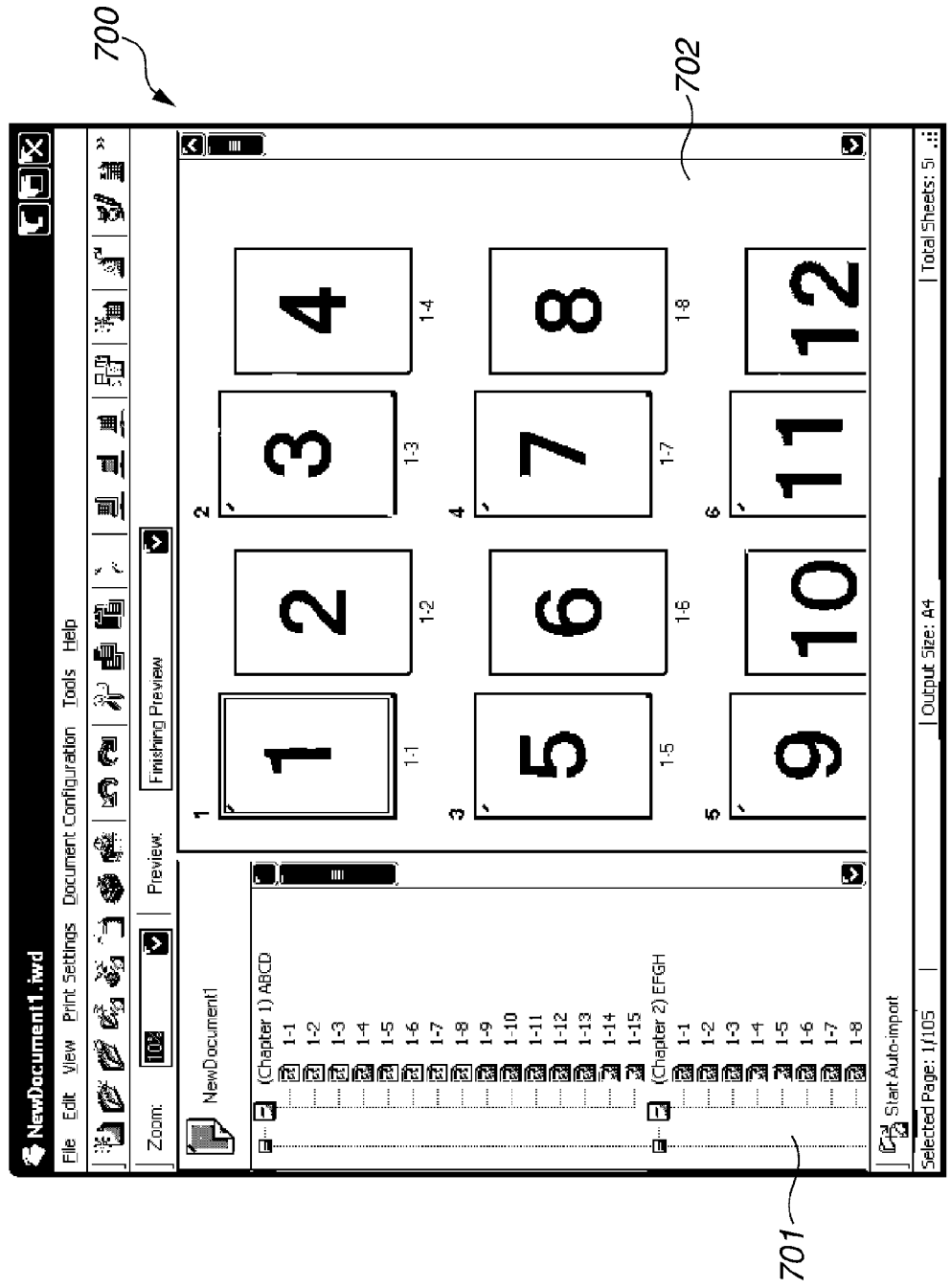
FIG. 9 illustrates an example of a user interface (UI) screen to be displayed when a book file is opened based on a structure, an attribute, and contents of the book file according to an exemplary embodiment of the present invention.

FIG. 9 illustrates an example of a user interface (UI) screen to be displayed when a book file is opened according to a structure, an attribute, and contents of the book file. In FIG. 9, a GUI screen 700 includes a tree section 701 that indicates a book structure and a preview section 702 that displays a state of printed pages. The tree section 701 displays all chapters included in the book and pages included in each chapter to form a tree structure as illustrated in FIG. 3.

The page displayed in the tree section 701 is a page of the original. The preview section 702 displays a reduced image of each printed page. The display order in the preview section 702 reflects the structure of a book.

The present exemplary embodiment may allow users to perform the following editing operations for each chapter and each page of a book file generated based on application data as described above.
(1) new addition
(2) deletion (3) copy
(4) cut
(5) paste
(6) shift
(7) change of chapter name
(8) renumber/rename of page
(9) cover insertion
(10) interleaf insertion
(11) index sheet insertion
(12) page layout relative to each original page The present exemplary embodiment allows users to cancel an editing operation after having been previously set, or allows users to instruct execution of a previously canceled operation. In short, the editing functions according to aspects of the present exemplary embodiment enable users to perform various operations including, for example, integration of a plurality of book files, relocation of chapters and pages in a book file, deletion of chapters and pages in a book file, layout change of an original page, and insertion of an interleaf or an index sheet.

If a user performs the above-described operations, the system according to the present exemplary embodiment may reflect the operation result to the attributes illustrated in FIGS. 4 to 6 or may change the structure of a book file. For example, if a user instructs addition of a new blank page, the system according to the present exemplary embodiment can insert a blank page at a designated portion.

The inserted blank page is regarded as an original page. If a user changes the layout of an original page, the system according to the present exemplary embodiment reflects the changed contents as part of the attributes (e.g., print method, N-up print, front cover/back cover, index sheet, interleaf, and chapter break). Examples relating to the display and operations in the editing processing according to an example embodiment are described below in more detail.

A book file having been generated/edited as described above can be printed as a final output. In one version, if a selects a file menu from the GUI screen 700 of the bookbinding application 104 illustrated in FIG. 9 and designates printing of the selected file name, a designated output device prints out the selected file.

In this case, the bookbinding application 104 may generate a job ticket based on the presently opened book file and transmit the generated job ticket to the electronic original despooler 105. The electronic original despooler 105 can receive the job ticket and convert the received ticket into an output command of the OS (e.g., GDI command) and transmit the output command to an output module (e.g., GDI). The output module generates a command suitable to the output device with the designated printer driver 106 and transmits the generated command to the output device.

A graphic engine of an output module (not illustrated) can load the printer driver 106, which can be prepared for each printing apparatus, from the external memory 211 to the RAM 202. The graphic engine sets an output to the printer driver 106. The output module converts the received GDI function into a DDI function, and outputs the DDI function to the printer driver 106.

The printer driver 106 generates a control command, such as a page description language (PDL), that can be recognized by the printer based on the DDI function received from the output module. A system spooler loaded into the RAM 202 by the OS outputs the generated printer control command to the printer 107 via an interface 21 as print data.

The above-described job ticket may have a data structure including original pages (minimum units). The data structure of a job ticket can define the layout of original pages on a paper. One job ticket can be issued for one job. Therefore, a job ticket may include an uppermost-layer node "document" which defines attributes of the entire document, such as two-sided printing/one-sided printing. Paper nodes, each subordinating to the document node, can include an identifier of paper to be used and designation of a paper feed port of a printer.

A node of a sheet printed with the paper may belong to each paper node. One sheet corresponds to apiece of printing paper. A printed page (i.e., a physical page) belongs to each sheet. If the print method is the one-sided printing, one physical page belongs to one sheet. If the print method is the two-sided printing, two physical pages belong to one sheet. A disposed original page belongs to each physical page.

Figure 10:
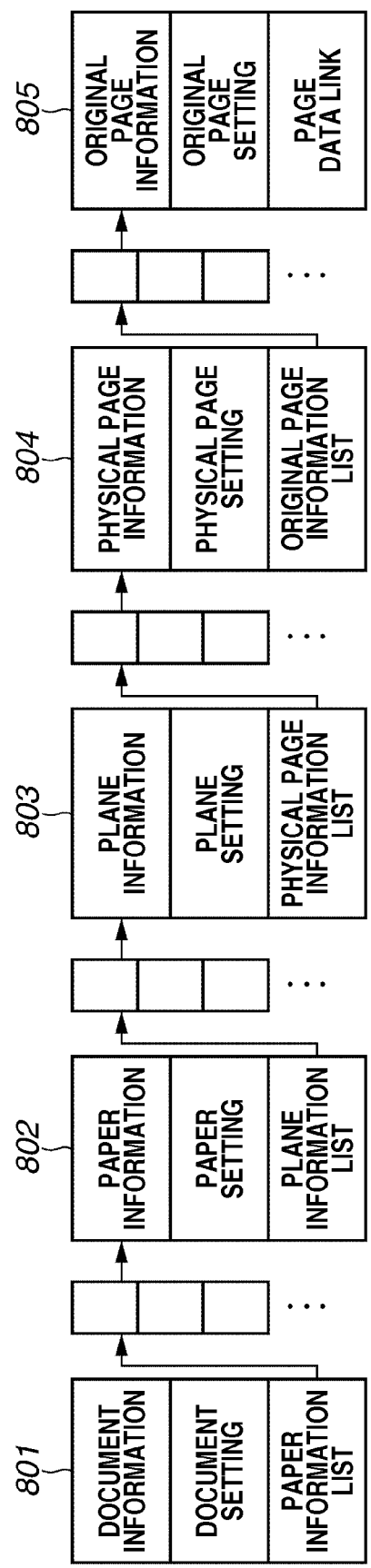
FIG. 10 illustrates an example of a data structure of a job ticket according to an exemplary embodiment of the present invention.

FIG. 10 illustrates an example of a data structure of a job ticket. According to print data, a document is configured as an assembly of sheets. Each sheet includes two, front and back, surfaces. Each surface has an area that can be used for the layout of an original (i.e., the physical page). Each physical page can be configured as an assembly of original pages (i.e., minimum units).

Document-related data 801 includes data relating to the entire document and a paper information list of papers that construct the document. Paper information 802 includes paper related information, such as a paper size and a plane information list disposed on the paper. Plane information 803 includes plane unique data and a physical page information list disposed on the plane.

Physical page information 804 includes information relating to a physical page size, header/footer dimensions, and an original page information list of original pages that configure the physical pages. The electronic original despooler 105 converts the above-described job ticket into an output command to be supplied to the output module.

As described above, when the bookbinding application 104 opens a book file, the GUI screen 700 illustrated in FIG. 9 is displayed on the CRT 210. A tree illustrated in the tree section 701 represents a structure of the opened book (hereinafter, referred to as a "target book").

The present exemplary embodiment prepares a total of three display methods for the preview section 702, which can be selected according to, for example, a user's preference. A first display method is referred to as an "original view mode" which directly displays reduced images of original pages belonging to the target book, although the display in the preview section 702 does not reflect the layout.

A second display method is referred to as a "print view mode" which displays original page images in the preview section 702 that reflects the layout of the original pages.

A third display method is referred to as a "simple print view mode" which does not display the contents of each original page in the preview section 702 although the layout is reflected.

Figure 11:
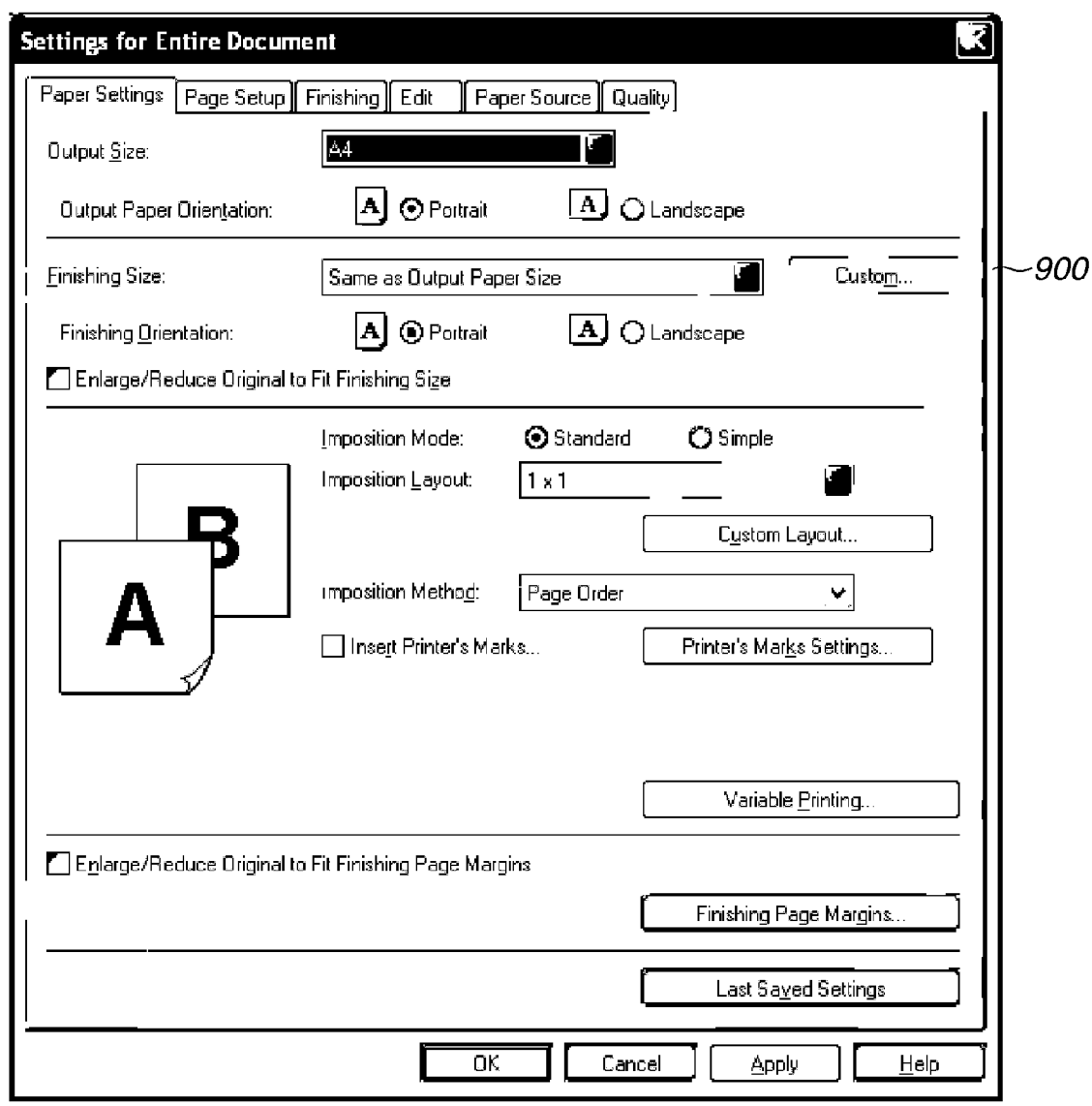
FIG. 11 illustrates a "document detailed settings" window included in a bookbinding application according to an exemplary embodiment of the present invention.

FIG. 11 illustrates a "document detailed settings" window 900 of the bookbinding application 104. The window illustrated in FIG. 11 enables users to display and set the "document setting information" 303. The window illustrated in FIG. 11 can be activated by using a "Settings for Entire Document" menu of a Print Settings menu displayed on an application operation screen illustrated in FIG. 9, or can be activated by using a "Settings for Entire Document" button on a toolbar.

The "document detailed settings" window 900 is a window that enables users to perform attribute settings that influence the entire document. The "document detailed settings" window 900 includes five sheets of Paper Settings, Page Setup, Finishing, Edit, Paper Source, and Quality. FIG. 11 illustrates a state where the Paper Settings sheet is displayed. The Paper Settings sheet enables users to chiefly perform layout related settings. Therefore, users can instruct a paper size, a paper orientation, and other settings using the "document detailed settings" window 900.

Figure 12:
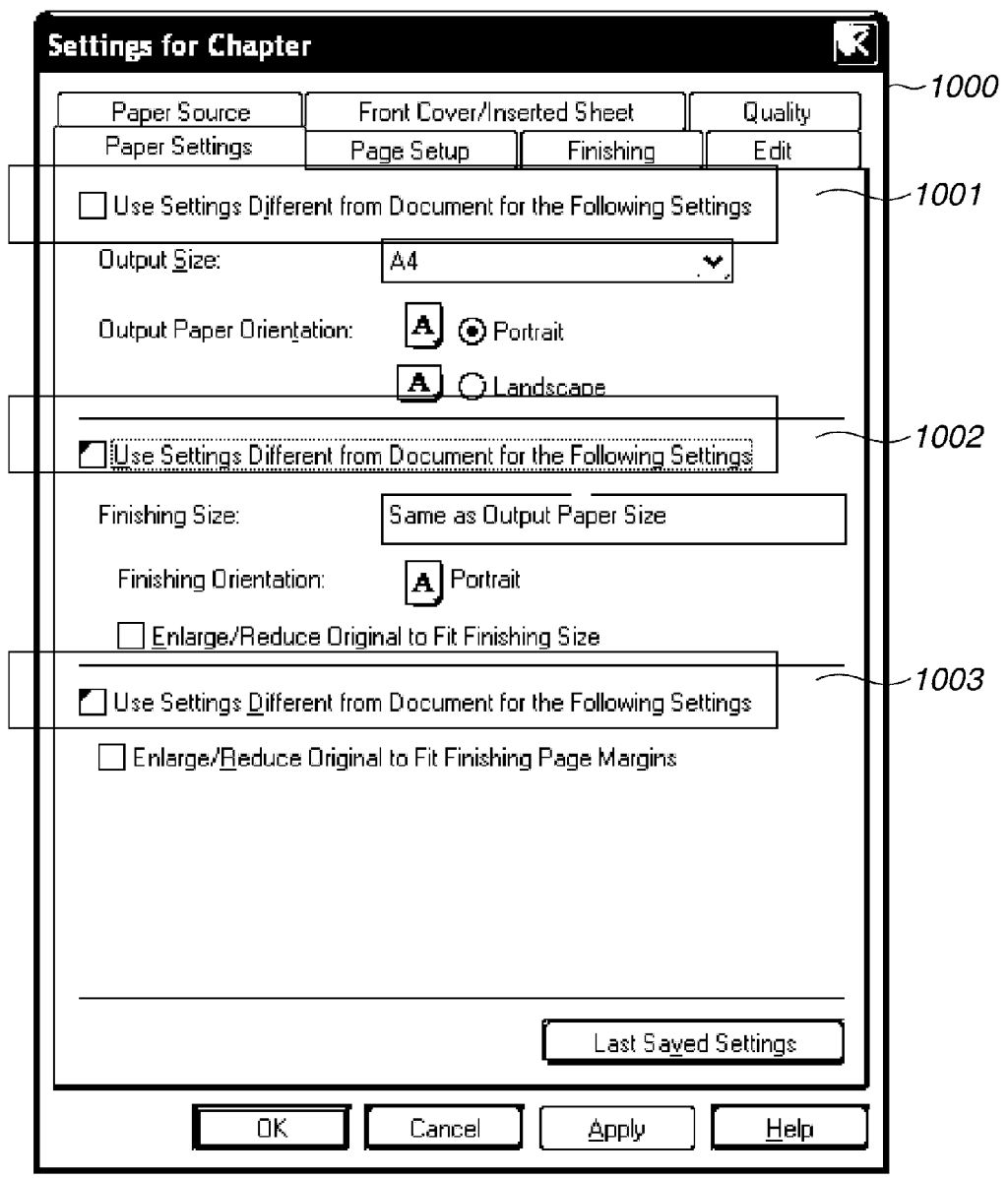
FIG. 12 illustrates a "chapter detailed settings" window included in the bookbinding application according to an exemplary embodiment of the present invention.

FIG. 12 illustrates a "chapter detailed settings" window 1000 included in the bookbinding application 104. The "chapter detailed settings" window 1000 illustrated in FIG. 12 enables users to display and set the "chapter setting information" 307. The window illustrated in FIG. 12 can be activated by using a "Settings for Chapter" menu of the "Print Settings menu" displayed on the application operation screen illustrated in FIG. 9, or can be activated by using a "Settings for Chapter" button on the toolbar.

The "chapter detailed settings" window 1000 is a window that enables users to perform chapter unique attribute settings. The "chapter detailed settings" window 1000 includes seven sheets of Paper Settings, Page Setup, Finishing, Edit, Paper Source, Front Cover/Inserted Sheet, and Quality.

FIG. 12 illustrates a state where the Paper Settings sheet is displayed. The Paper Settings sheet enables users to chiefly perform sheet related settings that are unique for each chapter. Therefore, users can instruct a paper size, a paper orientation, finishing, and other settings using the "chapter detailed settings" window 1000.

The chapter detailed settings" window 1000 includes three check box controls "Use Settings Different from Document for the Following Settings" 1001, 1002, and 1003 for setting items commonly set for the "document detailed settings" and the "chapter detailed settings."

If a check mark is input in the check box of an item group, values having been set for the "chapter detailed settings" are directly applied to the chapter. In other words, the document setting values are not applied in this case.

The chapter unique settings can be classified into two types. Setting items that can be possessed only by a chapter are one type of the chapter unique settings. Unique setting values stored in a chapter, which are different from those of the upper-layer document, are the other type of the chapter unique settings.

Figure 13:
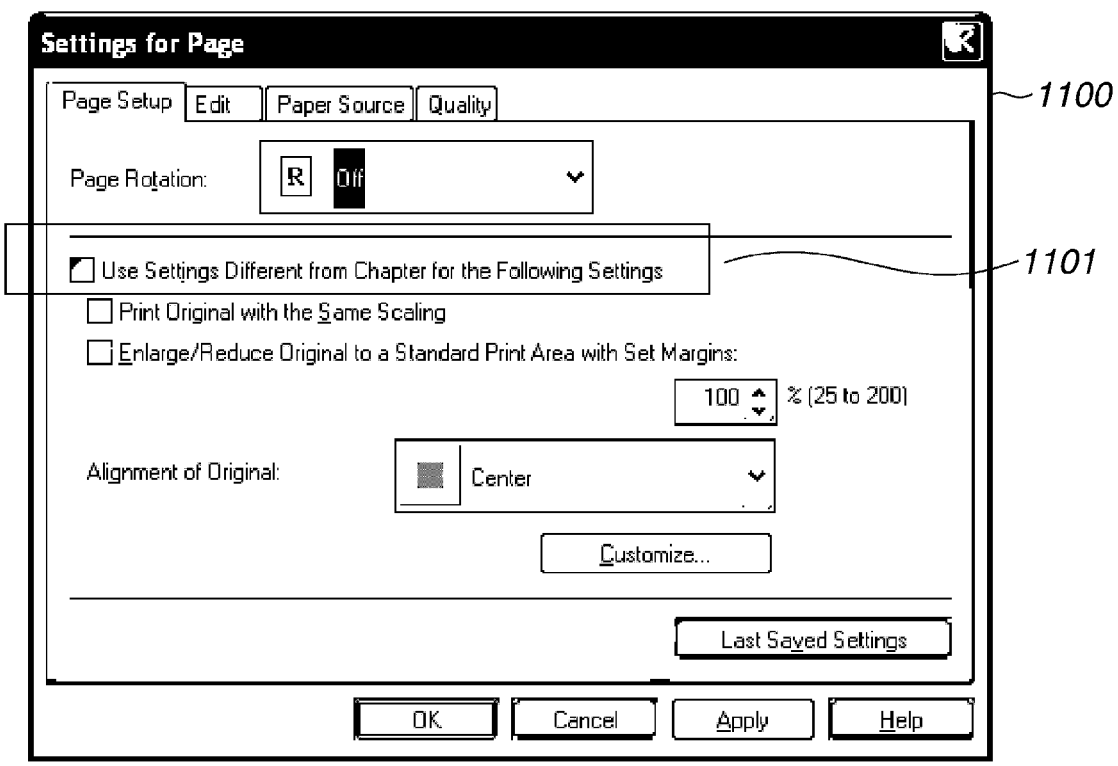
FIG. 13 illustrates "page detailed settings" window included in the bookbinding application according to an exemplary embodiment of the present invention.

FIG. 13 illustrates a "page detailed settings" window 1100 included in the bookbinding application 104. The "page detailed settings" window 1100 enables users to display and set the "page setting information" 311. The window illustrated in FIG. 13 can be activated by using a "Settings for Page" menu of the "Print Settings menu" displayed on the application operation screen illustrated in FIG. 9, or can be activated by using a "Settings for Page" button on the toolbar.

The "page detailed settings" window 1100 is a window that enables users to perform page unique attribute settings. The "page detailed settings" window 1100 includes four sheets of Page Setup, Edit, Paper Source, and Quality. FIG. 13 illustrates a state where the Page Setup sheet is displayed.

The Page Setup sheet enables users to perform layout related settings unique to each page. For example, a user can instruct a rotational angle and an enlarge/reduce rate in determining the layout of an original page. The "page detailed settings" window 1100 includes a check box control "Use Settings Different from Chapter for the Following Settings" 1101 for setting items commonly set for the "chapter detailed settings" and the "page detailed settings." If a check mark is not input in the check box 1101, the chapter setting values are directly applied to the page.

The check box control information having been set using the above-described setting screen can be stored in a special area or can be stored as an attribute included in the setting information illustrated in FIG. 3. In this case, areas that can store the check box control information are added to FIGS. 5 and 6.

Figure 14:
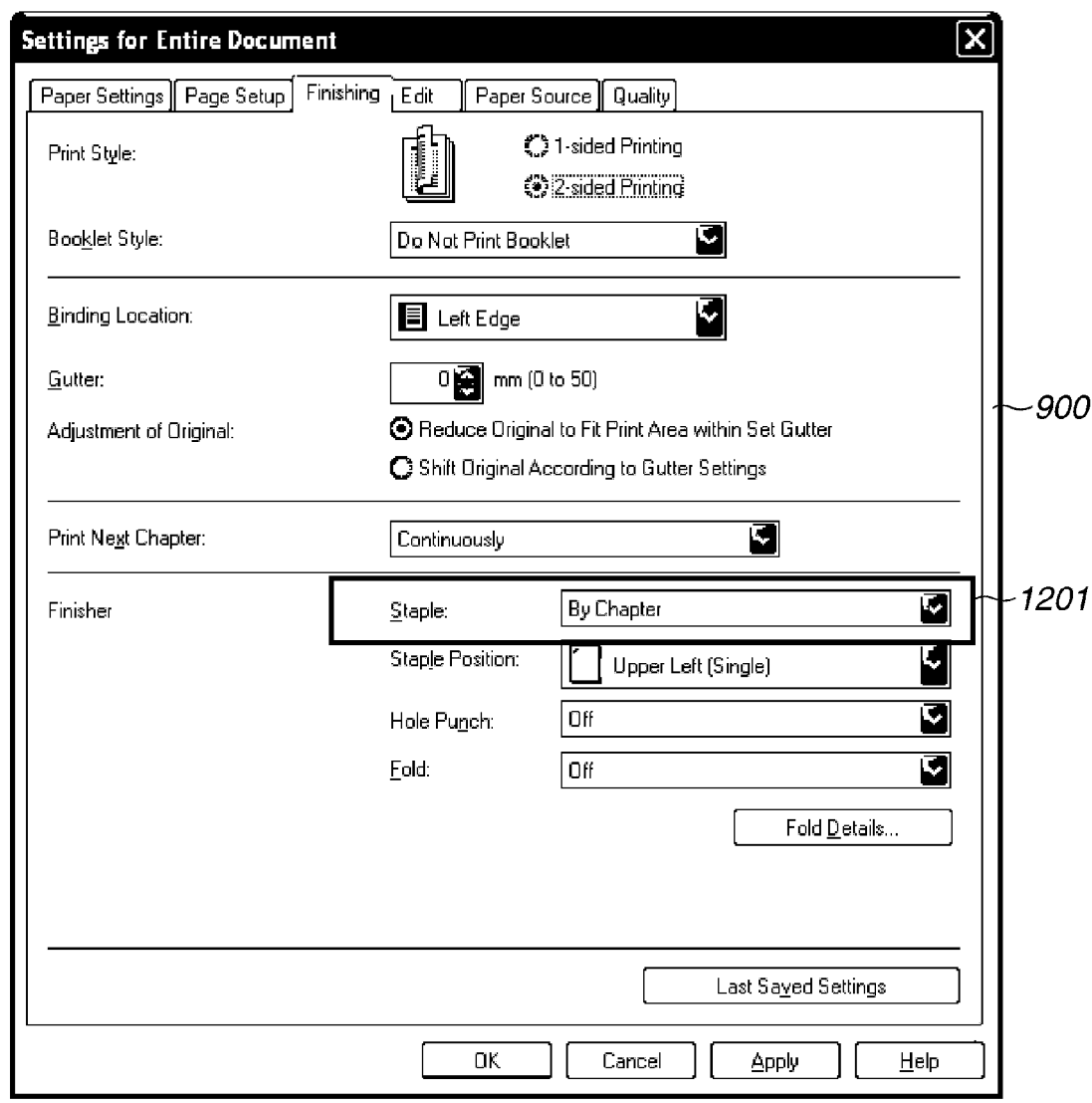
FIG. 14 illustrates an example of staple settings that can be set using the document detailed settings window of the bookbinding application according to an exemplary embodiment of the present invention.

FIG. 14 illustrates an example of staple settings having been performed using the "document detailed settings" window 900 of the bookbinding application 104. A "Staple" combo box 1201 of the Finishing sheet includes four choices of Off, All Page At Once, By Chapter, and Group Copies of Same Page. If a user selects "Off", staple OFF setting is set. If a user selects "All Pages At Once", each set can be stapled. If a user selects "By Chapter", each chapter can be stapled. If a user selects "Group Copies of Same Page", two or more sets of the same pages can be stapled as groups. FIG. 14 illustrates a state where the "Finishing sheet" is opened and the "Staple" is set to "By Chapter."

Figure 15:
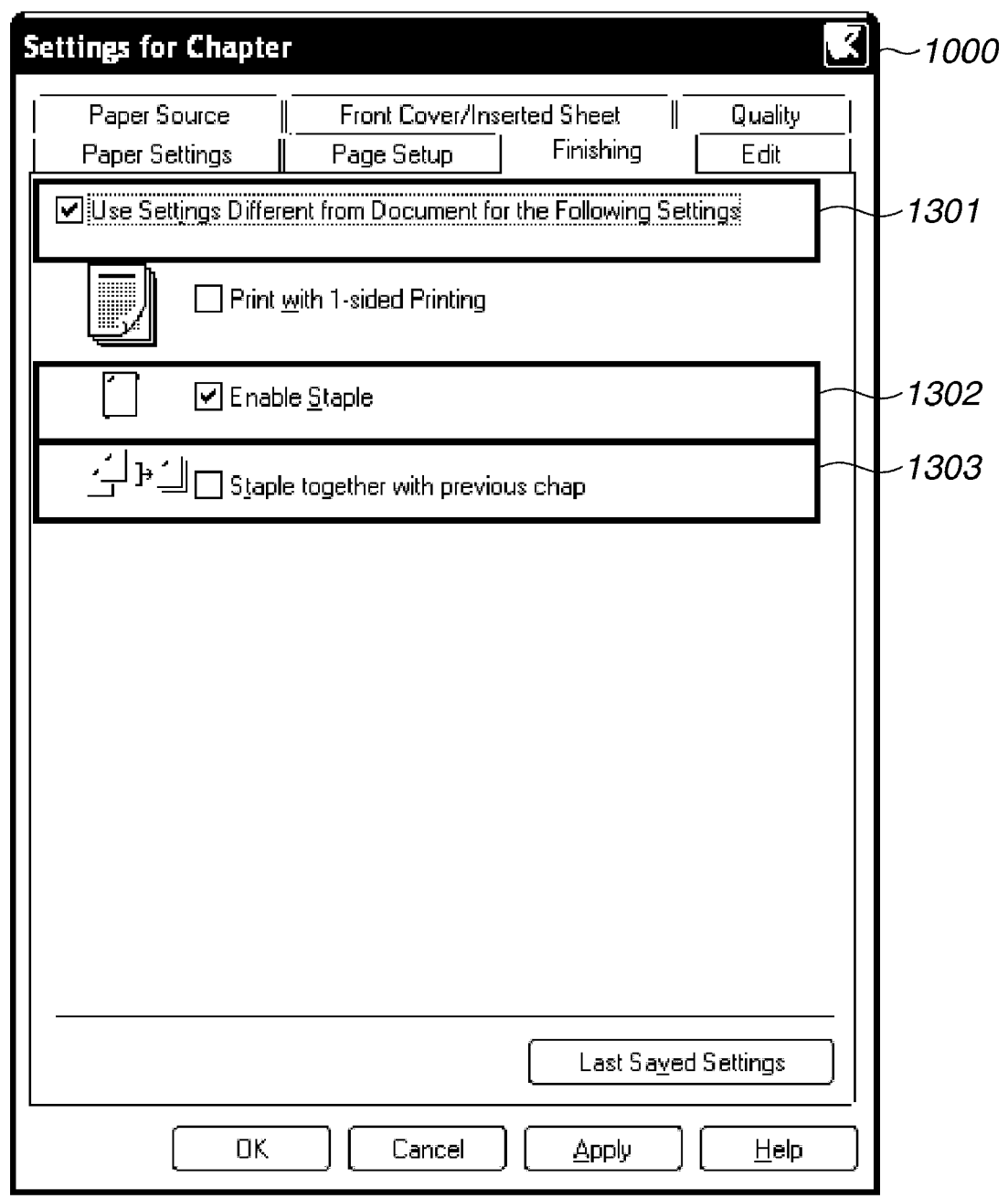
FIG. 15 illustrates an example of chapter staple settings performed when the "chapter detailed settings" window of the bookbinding application is opened according to an exemplary embodiment of the present invention.

FIG. 15 illustrates an example of chapter staple settings performed when the "chapter detailed settings" window 1000 of the bookbinding application 104 is opened. A user can perform chapter unique settings by checking a "Use Settings Different from Document for the Following Settings" check box 1301 on the "Finishing sheet." Further, the user can instruct staple ON/OFF of this chapter by changing a check state of the "Enable Staple" check box 1302. Moreover, the user can change a check state of the "Staple together with previous chapter" check box 1302 if the user cancels the staple of each chapter and instruct to staple the present chapter together with the preceding chapter.

If the user inputs a check mark in the check box 1302 for the second chapter and removes a check mark from the check box 1303 in a state where a check mark is input in the check box 1302 for the first chapter, the first chapter and the second chapter can be separately stapled. If the user inputs check marks in both the check box 1302 and the check box 1303 for the second chapter in a state where a check mark is input in the check box 1302 for the first chapter, the first chapter and the second chapter can be stapled together as a group.

In this case, if the user further inputs check marks in both the check box 1302 and the check box 1303 for the third chapter, the third chapter can be stapled together with the first and second chapters.

If the user inputs a check mark in the check box 1303 for the second chapter in a state where no check mark is input in the check box 1302 for the first chapter, the first chapter is excluded from the group of chapters to be stapled together. Therefore, the first chapter and the second chapter are not continuously stapled. In this respect, the check box 1303 may become meaningless depending on the settings of the preceding chapter. If the staple OFF setting is set for the preceding chapter or if the present chapter is the first chapter, the bookbinding application 104 can disable the check box 1303.

Figure 16:
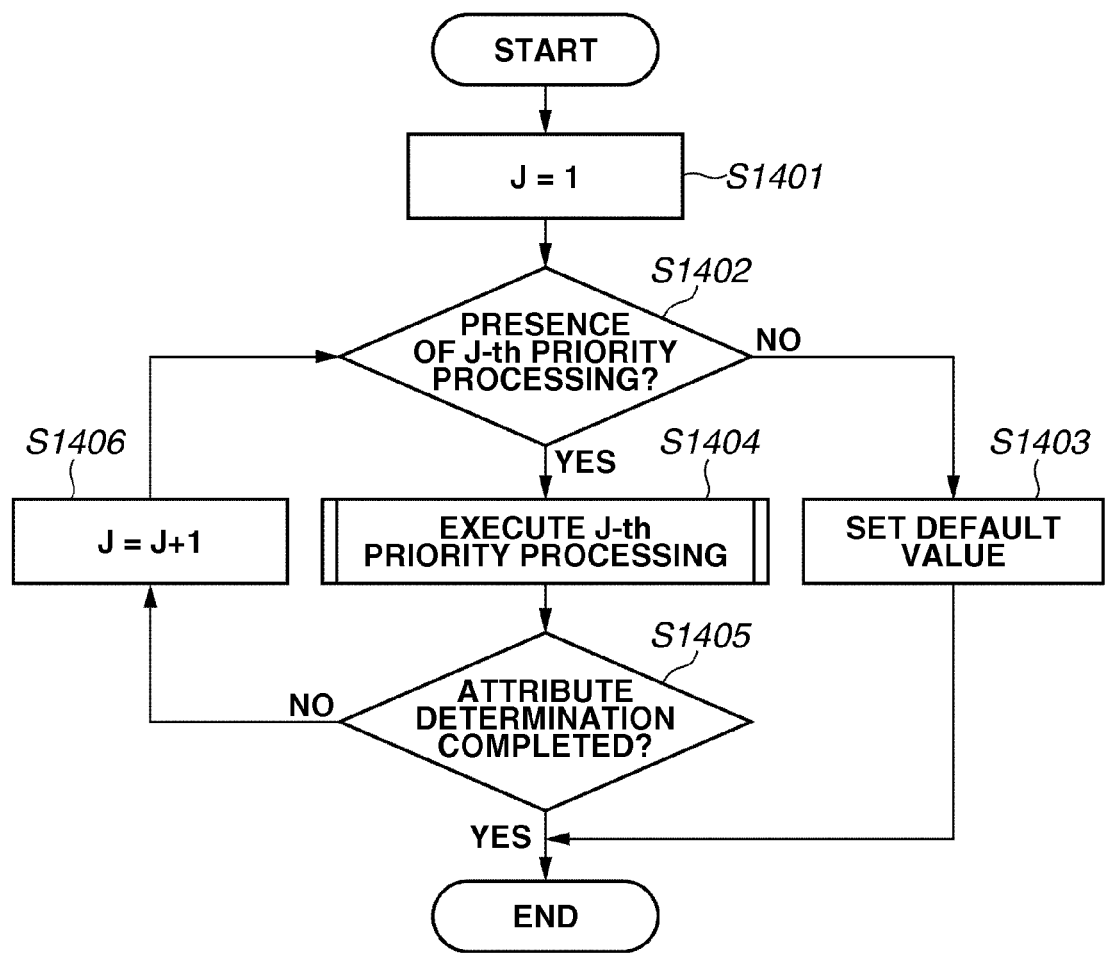
FIG. 16 is a flowchart illustrating a procedure of chapter staple attribute setting processing based on the "staple by chapter" setting in a case where a new chapter is added between an I-th chapter and an (I+1) th chapter by chapter editing according to an exemplary embodiment of the present invention.

FIG. 16 is a flowchart illustrating a procedure of chapter staple attribute setting processing based on the "staple by chapter" setting in a case where a new chapter is added between the I-th chapter and the (I+1)th chapter by chapter editing. The flowchart illustrated in FIG. 16 includes at least one attribute setting processing. A priority order is allocated to each processing. A plurality of processing in the flowchart illustrated in FIG. 16 can be continuously executed according to the priority order until the attribute is determined.

The new chapter can be generated by inputting new data from the outside, dividing an existing chapter, or shifting an existing chapter to the I-th position.

In step S1401, the bookbinding application 104 initializes a counter J (i.e., J=1). In step S1402, the bookbinding application 104 determines whether attribute determination processing having a J-th priority is present.

More specifically, the bookbinding application 104 allocates a priority order to each of a plurality of attribute determination processing and executes each processing according to the allocated priority order. The bookbinding application 104 determines whether the present state is a state where the attribute is not yet determined even after all of the attribute determination processing has been completed.

If the bookbinding application 104 determines that there is any processing to be executed is present (YES in step S1402), the processing proceeds to step S1404. If the bookbinding application 104 determines that all of the processing has been completed (NO in step S1402), the processing proceeds to step S1403.

In step S1403, the bookbinding application 104 sets a default value because the attribute cannot be determined even after all of the attribute determination processing has been completed. The default value can be a fixed value that corresponds to a staple setting value of an individual chapter, or can be identical to a setting value of the original chapter if the present chapter is a divided chapter. Further, the default value can be identical to a setting value of the original chapter if the present chapter is a shifted chapter.

In step S1404, the bookbinding application 104 executes the staple attribute setting processing having the J-th priority referring to the counter J. The attribute setting processing is described below in more detail. After completing the staple attribute setting processing, the processing proceeds to step S1405.

In step S1405, the bookbinding application 104 determines whether the staple attribute has been determined. If the bookbinding application 104 determines that the attribute determination has been completed (YES in step S1405), the bookbinding application 104 terminates the processing of the routine illustrated in FIG. 16. If the bookbinding application 104 determines that the attribute determination has not been completed (NO in step S1405), the processing proceeds to step S1406.

In step S1406, the bookbinding application 104 increments the counter J. Then, the processing returns to step S1402, in which the bookbinding application 104 executes the next staple attribute setting processing.

Figure 17:
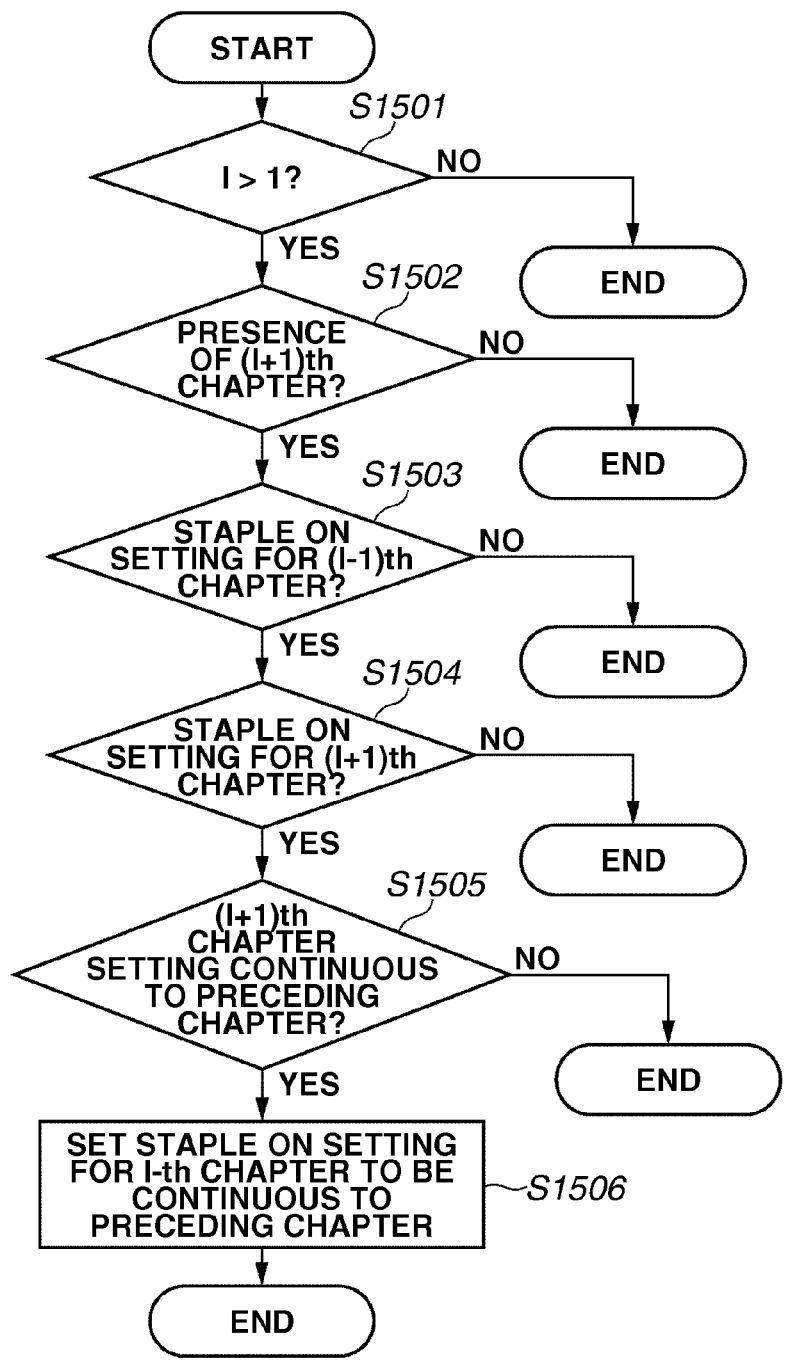
FIG. 17 is a flowchart illustrating an example of staple attribute setting processing to be performed in step S1404 of FIG. 16 according to an exemplary embodiment of the present invention.

FIG. 17 is a flowchart illustrating an example of the staple attribute setting processing to be executed in step S1404 of FIG. 16. In this case, it is assumed that a new chapter or a shifted chapter can be generated between an (I−1)th chapter and an I-th chapter in a state where the chapter editing processing is not started. As a result, the I-th chapter becomes an (I+1)th chapter.

In step S1501, the bookbinding application 104 determines whether the parameter I is greater than 1. If the bookbinding application 104 determines that a new chapter is the first chapter (i.e., I=1), the bookbinding application 104 terminates the processing of the routine illustrated in FIG. 17 without determining the staple attribute of the chapter setting information 307 for the I-th chapter. If the bookbinding application 104 determines that the parameter I is greater than 1 (YES in step S1501), the processing proceeds to step S1502.

In step S1502, the bookbinding application 104 determines whether an (I+1)th chapter is present. If the bookbinding application 104 determines that the (I+1)th chapter is absent (NO in step S1502), i.e., if the new chapter is a final chapter, the bookbinding application 104 terminates the processing of the routine illustrated in FIG. 17 without determining the staple attribute.

If the bookbinding application 104 determines that the (I+1)th chapter is present (YES in step S1502), the processing proceeds to step S1503. In step S1503, the bookbinding application 104 checks the staple attribute of the chapter setting information 307 for the (I−1)th chapter, i.e., the preceding chapter, and determines whether the staple ON setting has been set for the (I−1)th chapter.

In this case, if a check mark is input in the check box 1302 illustrated in FIG. 15, the bookbinding application 104 determines that the staple ON setting has been set for the (I−1)th chapter. If no check mark is input in the check box 1302 illustrated in FIG. 15, the bookbinding application 104 determines that the staple OFF setting has been set for the (I−1)th chapter.

In step S1503, the bookbinding application 104 checks the staple attribute 2801 of the chapter setting information 307 for the (I−1)th chapter. If the staple OFF setting has been set for the (I−1)th chapter (NO in step S1503), the bookbinding application 104 terminates the processing of the routine illustrated in FIG. 17. If the staple ON setting has been set for the (I−1)th chapter (YES in step S1503), the processing proceeds to step S1504. In step S1504, the bookbinding application 104 checks the staple attribute 2801 for the (I+1)th chapter.

If the staple OFF setting has been set for the (I+1)th chapter (YES in step S1504), the bookbinding application 104 terminates the processing of the routine illustrated in FIG. 17. If the staple ON setting has been set for the (I+1)th chapter (YES in step S1504), the processing proceeds to step S1505.

In step S1505, the bookbinding application 104 determines whether the staple continuation attribute 2802 set for the (I+1)th chapter is continuous to the preceding chapter. If the bookbinding application 104 determines that the staple continuation attribute 2802 set for the (I+1)th chapter is continuous (YES in step S1505), the processing proceeds to step S1506. If the bookbinding application 104 determines that the staple continuation attribute 2802 set for the (I+1)th chapter is not continuous (NO in step S1505), the bookbinding application 104 terminates the processing of the routine illustrated in FIG. 17.

If a check mark is input in the check box 1303 illustrated in FIG. 15, the bookbinding application 104 determines that the continuous staple setting is set for the preceding chapter and the present chapter. If no check mark is input in the check box 1303 illustrated in FIG. 15, the bookbinding application 104 determines that the continuous staple setting has not been set for the preceding chapter and the present chapter.

In step S1506, the bookbinding application 104 sets "staple ON" as the staple attribute 2801 of the chapter setting information 307 for the I-th chapter (i.e., the new chapter). The bookbinding application 104 further sets the staple continuation attribute 2802 as being continuous to the preceding chapter. Then, the bookbinding application 104 terminates the processing of the routine illustrated in FIG. 17.

An example of a status where the staple attribute can be determined according to the processing of the routine illustrated in FIG. 17 is described below with reference to FIGS. 18 and 19. Each of FIGS. 18 and 19 illustrates a schematic configuration of the tree section 701 extracted from the GUI screen 700.

Figure 18:
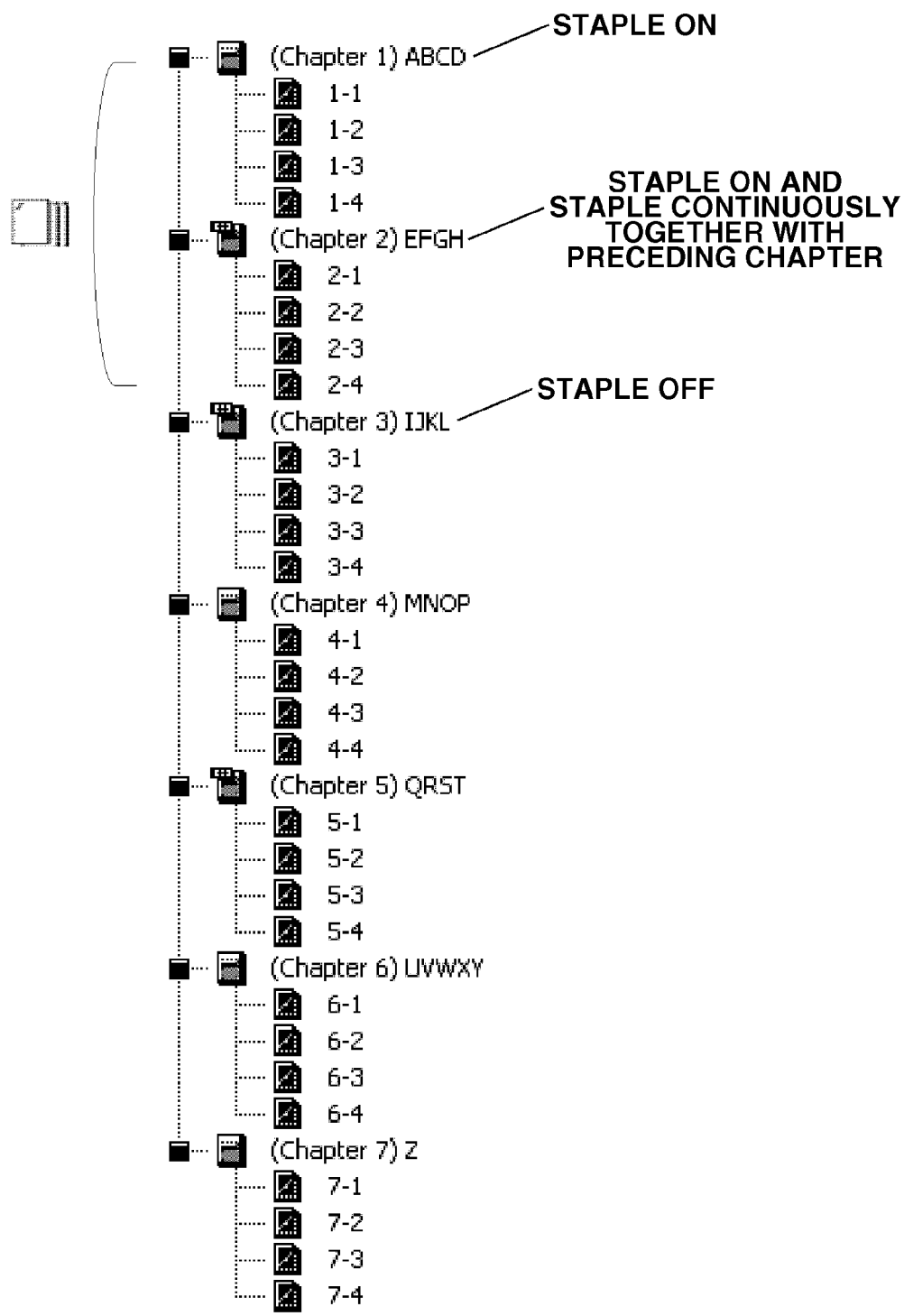
FIG. 18 illustrates an example of a schematic configuration of a tree section extracted from a graphic user interface (GUI) screen according to an exemplary embodiment of the present invention.
Figure 19:
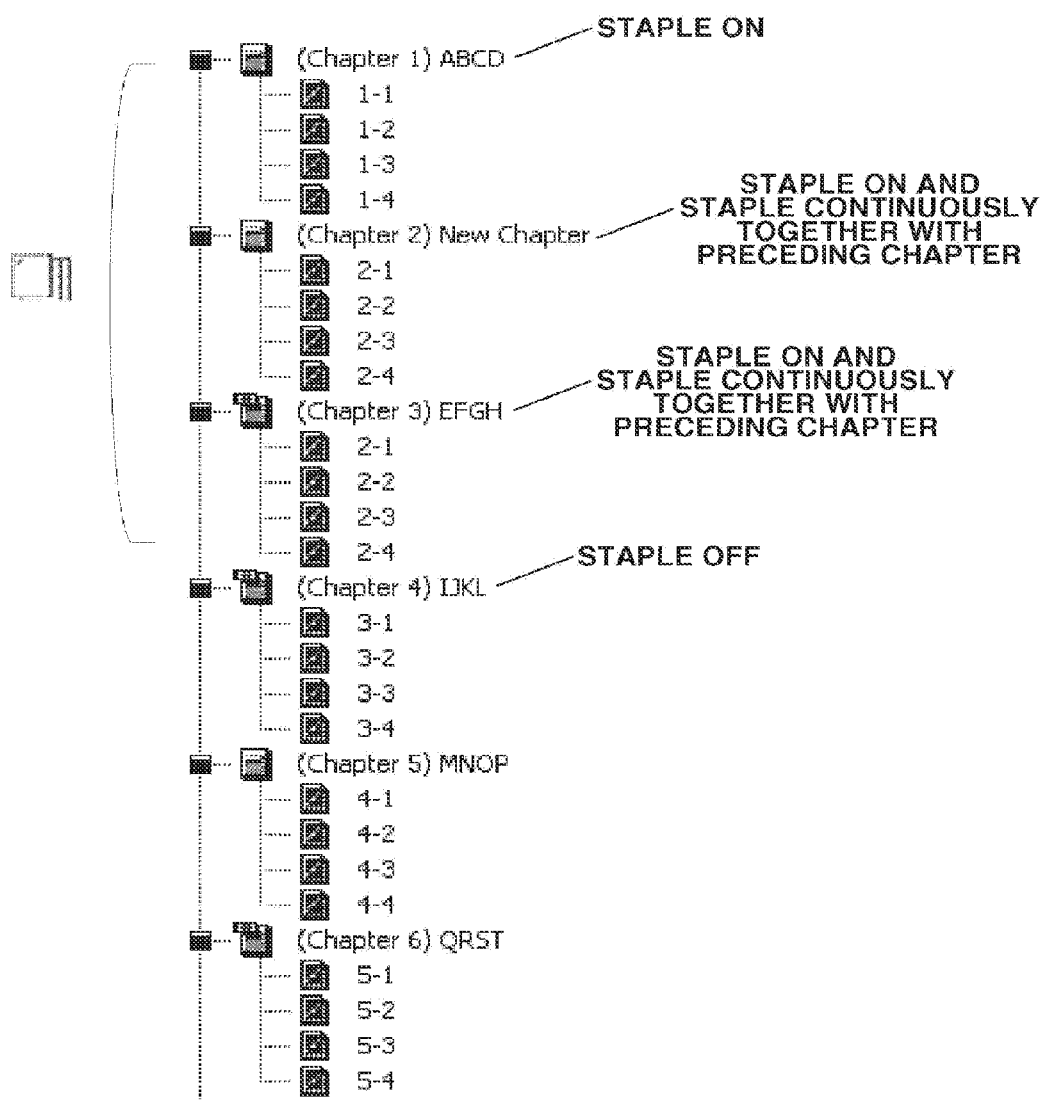
FIG. 19 illustrates an example of a schematic configuration of the tree section extracted from the GUI screen according to an exemplary embodiment of the present invention.

In FIGS. 18 and 19, a parenthesis on the left side indicates a plurality of chapters that are stapled together. According to an example illustrated in FIG. 18, the staple ON setting is set for two, i.e., first and second, chapters. FIG. 19 illustrates a state where a new chapter is inserted between the first chapter and the second chapter.

If the staple setting of the new chapter is not continuous to the preceding chapter, the first chapter and the second chapter to be stapled together may be separated by inserting the new chapter regardless of the staple attribute (i.e., staple OFF setting or staple ON setting) of the new chapter.

Through the processing of the present flowchart, the staple attribute 2801 of the new chapter can be set to "staple ON" and the staple continuation attribute 2802 can be set to be continuous to the preceding chapter. As a result, as illustrated in FIG. 19, a total of three, i.e., first to third, chapters including the former first and second chapters and the new chapter can be integrally stapled.

An example of processing for determining the chapter attribute according to attributes of the preceding and following chapters is described below. In this case, the chapters preceding and following a newly generated chapter (including a divided chapter) or a shifted chapter are not set to be integrally stapled.

Figure 20:
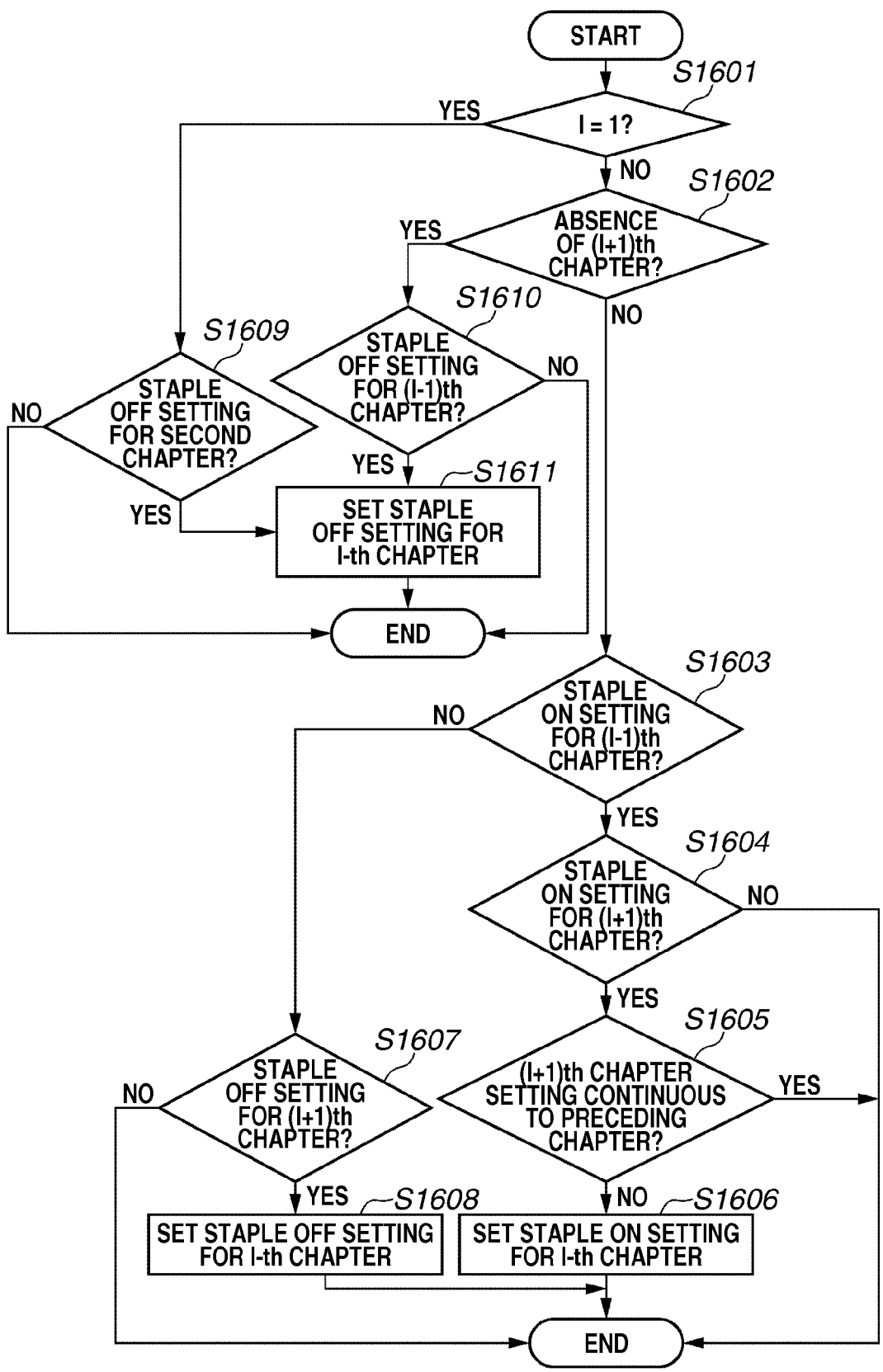
FIG. 20 is a flowchart illustrating an example of processing for determining a chapter staple attribute according to an exemplary embodiment of the present invention.

FIG. 20 is a flowchart illustrating an example of processing for determining a chapter staple attribute. In step S1601, the bookbinding application 104 determines whether the setting object chapter (i.e., the I-th chapter) is the first chapter. If the bookbinding application 104 determines that the I-th chapter is the head chapter (YES in step S601), the processing proceeds to step S1609.

In step S1609, the bookbinding application 104 checks the staple attribute 2801 of the second chapter (i.e., a chapter following the setting object) and determines whether the staple attribute 2801 of the second chapter is set to "staple off." If the bookbinding application 104 determines that the staple attribute 2801 of the second chapter is "staple off" (YES in step S1609), then in step S1611, the bookbinding application 104 sets "staple off" as the staple attribute 2801 for the I-th chapter.

If the bookbinding application 104 determines that the staple attribute 2801 of the second chapter is the staple ON setting (NO in step S1609), the bookbinding application 104 terminates the processing of the routine illustrated in FIG. 20 without determining the staple attribute because the continuous staple setting may be set for the second or subsequent chapter.

In step S1602, the bookbinding application 104 determines whether the next chapter that follows the setting object, i.e., the (I+1)th chapter, is present. In other words, the bookbinding application 104 determines whether the I-th chapter is the final chapter. If the bookbinding application 104 determines that the I-th chapter is the final chapter (YES in step S1602), the processing proceeds to step S1610. If the bookbinding application 104 determines that the I-th chapter is not the final chapter (NO in step S1602), the processing proceeds to step S1603.

In step S1603, the bookbinding application 104 checks the staple attribute 2801 of the (I−1)th chapter (i.e., the preceding chapter) and determines whether the staple attribute 2801 of the (I−1)th chapter is the staple ON setting. If the bookbinding application 104 determines that the staple ON setting has been set for the (I−1) th chapter (YES in step S1603), the processing proceeds to step S1604. If the bookbinding application 104 determines that the staple ON setting has not been set for the (I−1)th chapter (NO in step S1603), the processing proceeds to step S1607.

In step S1604, the bookbinding application 104 checks the staple attribute 2801 of the (I+1)th chapter (i.e., the following chapter) and determines whether the staple attribute 2801 of the (I+1)th chapter is the staple ON setting. If the bookbinding application 104 determines that the staple ON setting has been set for the (I+1)th chapter (YES in step S1604), the processing proceeds to step S1605. If the bookbinding application 104 determines that the staple ON setting has not been set for the (I+1)th chapter (NO in step S1604), the bookbinding application 104 terminates the processing of the routine illustrated in FIG. 20.

In step S1605, the bookbinding application 104 determines whether the staple continuation attribute 2802 of the (I+1)th chapter is a group staple ON setting. If the bookbinding application 104 determines that the staple continuation attribute 2802 of the (I+1)th chapter is the group staple ON setting (YES in step S1605), the bookbinding application 104 terminates the processing of the routine illustrated in FIG. 20. If the bookbinding application 104 determines that the staple continuation attribute 2802 of the (I+1)th chapter is not the group staple ON setting (NO in step S1605), the processing proceeds to step S1606. In step S1606, the bookbinding application 104 sets "staple ON" as the staple attribute 2801 of the I-th chapter.

In step S1607, the bookbinding application 104 determines whether the staple attribute 2801 of the (I+1)th chapter is the staple OFF setting. If the bookbinding application 104 determines that the staple OFF setting has been set for the (I+1)th chapter (YES in step S1607), the processing proceeds to step S1608 because it is confirmed that the staple OFF setting has been set for both of the chapters preceding and following the setting object.

In step S1608, the bookbinding application 104 sets "staple off" as the staple attribute 2801 of the I-th chapter.

In step S1610, the bookbinding application 104 checks the staple attribute 2801 of the chapter that precedes the final chapter. If the bookbinding application 104 determines that the staple attribute 2801 is the staple OFF setting (YES in step S1610), the processing proceeds to step S1611.

If the bookbinding application 104 determines that the staple attribute 2801 is the staple ON setting (NO in step S1610), the bookbinding application 104 terminates the processing of the routine illustrated in FIG. 20 without determining the staple attribute.

An example of a status where the staple attribute 2801 can be determined according to the processing of the routine illustrated in FIG. 20 is described below with reference to FIGS. 21 and 22. Each of FIGS. 21 and 22 illustrates a schematic configuration of the tree section 701 extracted from the GUI screen 700.

Figure 21:
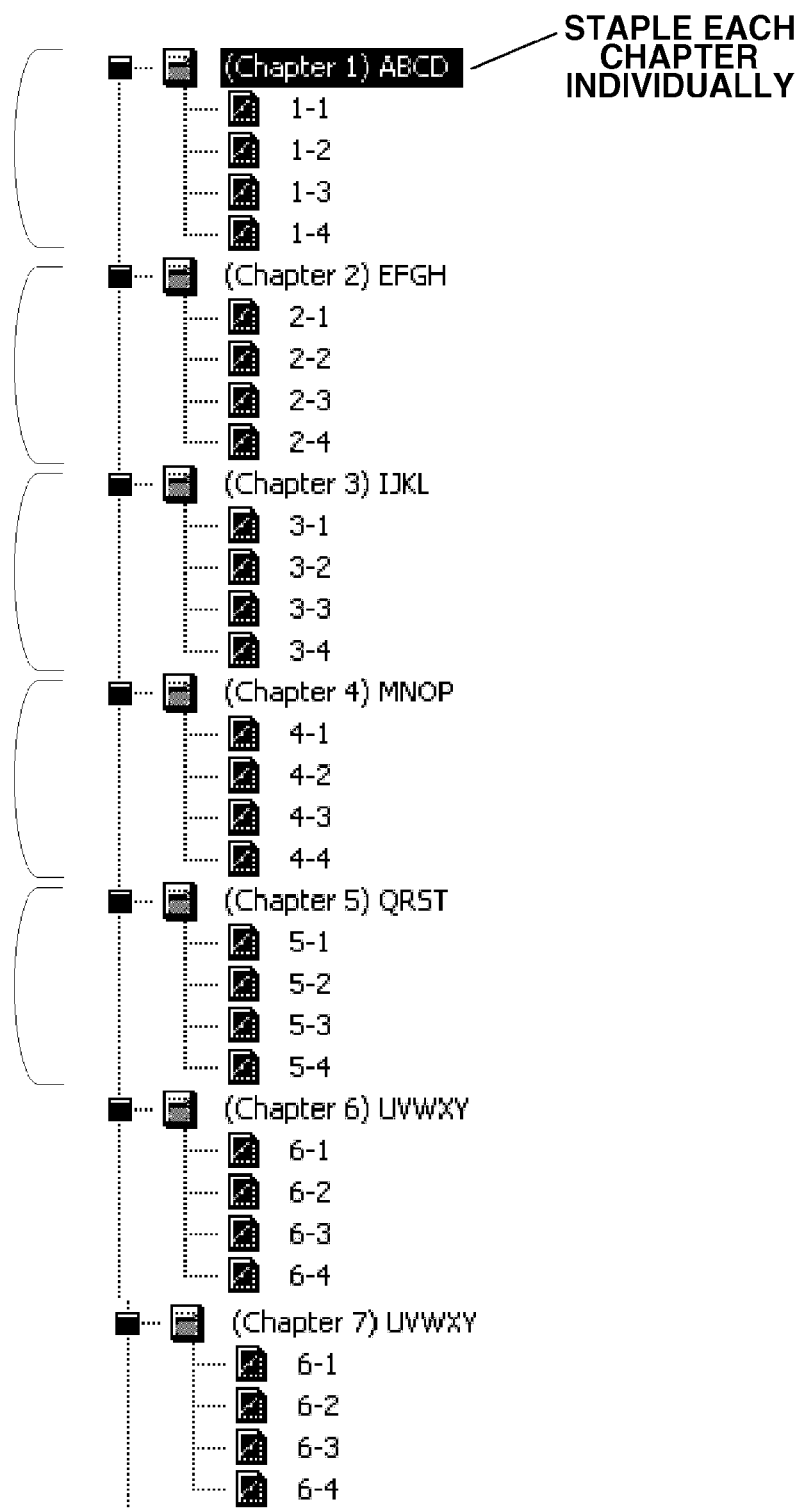
FIG. 21 illustrates an example of a schematic configuration of the tree section extracted from the GUI screen according to an exemplary embodiment of the present invention.
Figure 22:
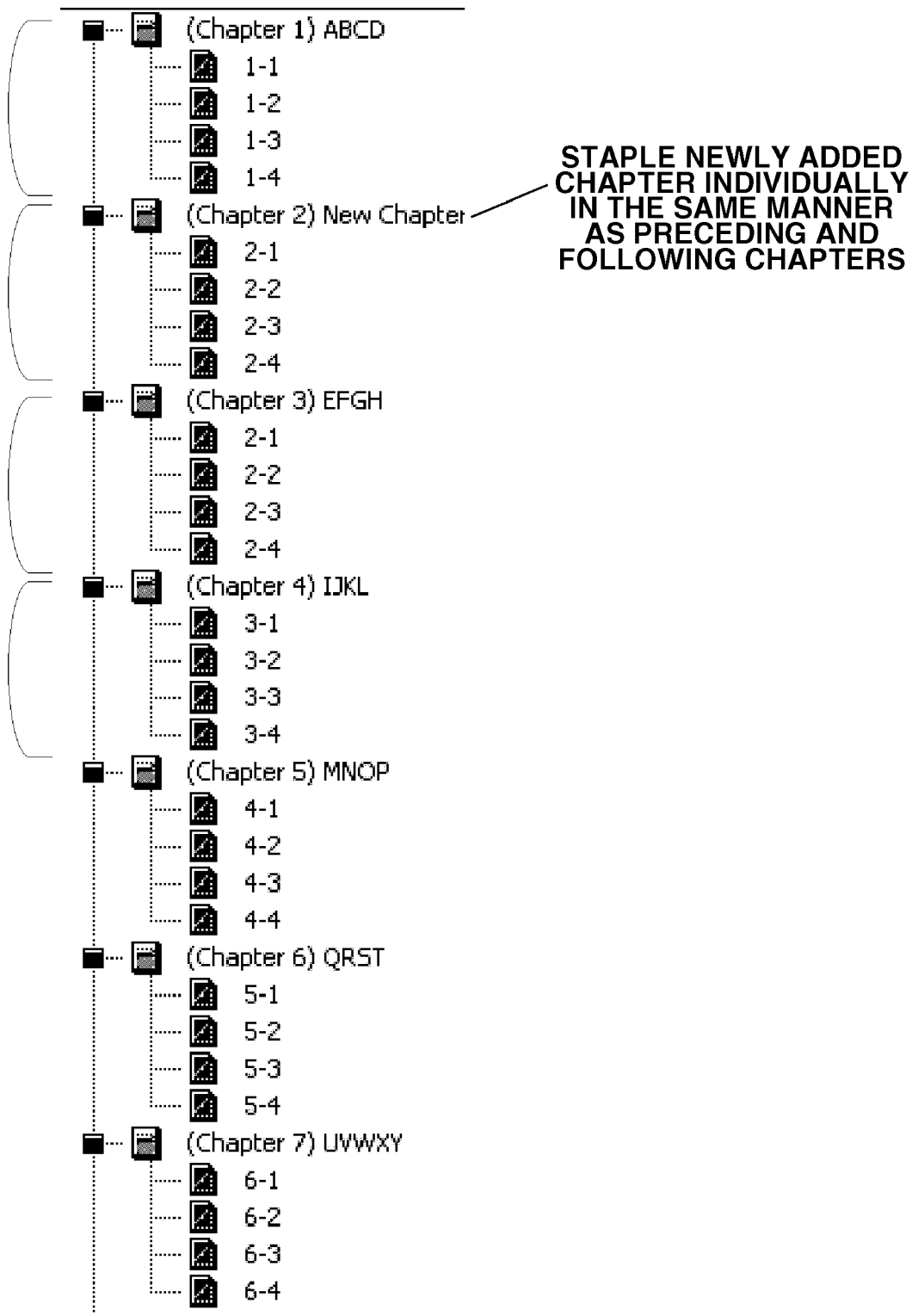
FIG. 22 illustrates an example of a schematic configuration of the tree section extracted from the GUI screen according to an exemplary embodiment of the present invention.

In FIGS. 21 and 22, a parenthesis on the left side indicates a plurality of chapters that are stapled together. According to the example illustrated in FIG. 21, there is no chapter that is continuously stapled together with the preceding chapter and each chapter is individually stapled as the staple attribute 2801.

FIG. 22 illustrates a state where a new chapter is inserted between the first chapter and the second chapter illustrated in FIG. 21. The staple attribute 2801 of the former first chapter and the former second chapter to be located before and after the new chapter is the "staple ON" setting. Therefore, through the above-described processing of the flowchart, "staple ON setting" is set as the staple attribute 2801 of a new chapter. As a result, as illustrated in FIG. 22, a document including each chapter to be individually stapled can be generated. According to the processing of the above-described flowchart, if the staple OFF setting is set for both the former first chapter and the former second chapter, "staple OFF setting" is set as the staple attribute 2801 of the new chapter.

Figure 23:
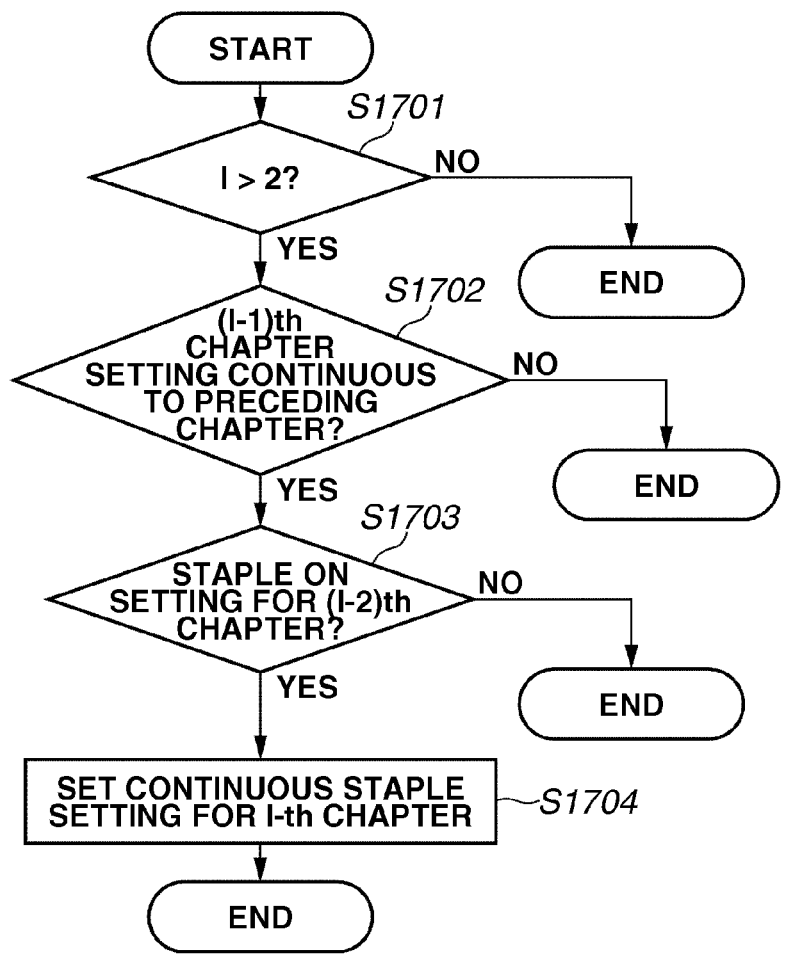
FIG. 23 is a flowchart illustrating an example of staple attribute setting processing to be executed in a case where a group staple ON setting is set for a chapter preceding a setting object and the setting object is added to a chapter group stapled together according to an exemplary embodiment of the present invention.

In a case where the group staple ON setting is set for a chapter that precedes or follows a new chapter (i.e., a setting object), "group staple ON setting" is set for the new chapter in the following manner. FIG. 23 is a flowchart illustrating an example of staple attribute setting processing to be performed in a case where a group staple ON setting is set for a chapter preceding a setting object and the setting object is added to a chapter group stapled together.

In step S1701, the bookbinding application 104 determines whether two or more chapters that precede the setting object (i.e., the I-th chapter) are present. If the parameter I is greater than 2 (i.e., I>2) (YES in step S1701), two or more preceding chapters are present. Therefore, the processing proceeds to step S1702.

If the bookbinding application 104 determines that the parameter I is equal to or less than 2 (NO in step S1701), the bookbinding application 104 terminates the processing of the routine illustrated in FIG. 23 without determining the staple attribute.

In step S1702, the bookbinding application 104 checks the staple attribute 2801 and the staple continuation attribute 2802 of the preceding chapter (i.e., (I−1)th chapter). The bookbinding application 104 determines whether the staple attribute of the (I−1)th chapter is the staple ON setting continuous to the preceding chapter. If the bookbinding application 104 determines that the staple attribute of the (I−1)th chapter is not the staple ON setting continuous to the preceding chapter (NO in step S1702), the bookbinding application 104 terminates the processing of the routine illustrated in FIG. 23.

If the bookbinding application 104 determines that the staple attribute of the (I−1)th chapter is the staple ON setting continuous to the preceding chapter (YES in step S1702), the processing proceeds to step S1703.

In step S1703, the bookbinding application 104 checks the staple attribute 2801 of the (I−2)th chapter (i.e., the character preceding the I-th chapter but one) and determines whether the staple attribute 2801 of the (I−2)th chapter is the staple ON setting.

For example, even when the previous chapter (i.e., (I−1)th chapter) is set to be continuously stapled together with its preceding chapter (i.e., (I−2)th chapter), the (I−2)th chapter may not be allowed to be stapled. In such a case, the previous chapter (i.e., (I−1)th chapter) is stapled independently. This is the reason why the bookbinding application 104 checks the staple attribute 2801 of the (I−2)th chapter.

Therefore, if the bookbinding application 104 determines that the staple attribute 2801 of the (I−2)th chapter is the staple ON setting (YES in step S1703), the processing proceeds to step S1704. If the bookbinding application 104 determines that the staple attribute 2801 of the (I−2)th chapter is not the staple ON setting (NO in step S1703), the bookbinding application 104 terminates the processing of the routine illustrated in FIG. 23.

In step S1704, the bookbinding application 104 sets "staple ON" as the staple attribute 2801 of the setting object (i.e., I-th chapter) and further sets a "group staple ON setting continuous to the preceding chapter" as the staple continuation attribute 2802 of the setting object (i.e., I-th chapter).

An example of a status where the staple attribute 2801 and the staple continuation attribute 2802 can be determined according to the processing of the routine illustrated in FIG. 23 is described below with reference to FIGS. 24 and 25. Each of FIGS. 24 and 25 illustrates a schematic configuration of the tree section 701 extracted from the GUI screen 700.

Figure 24:
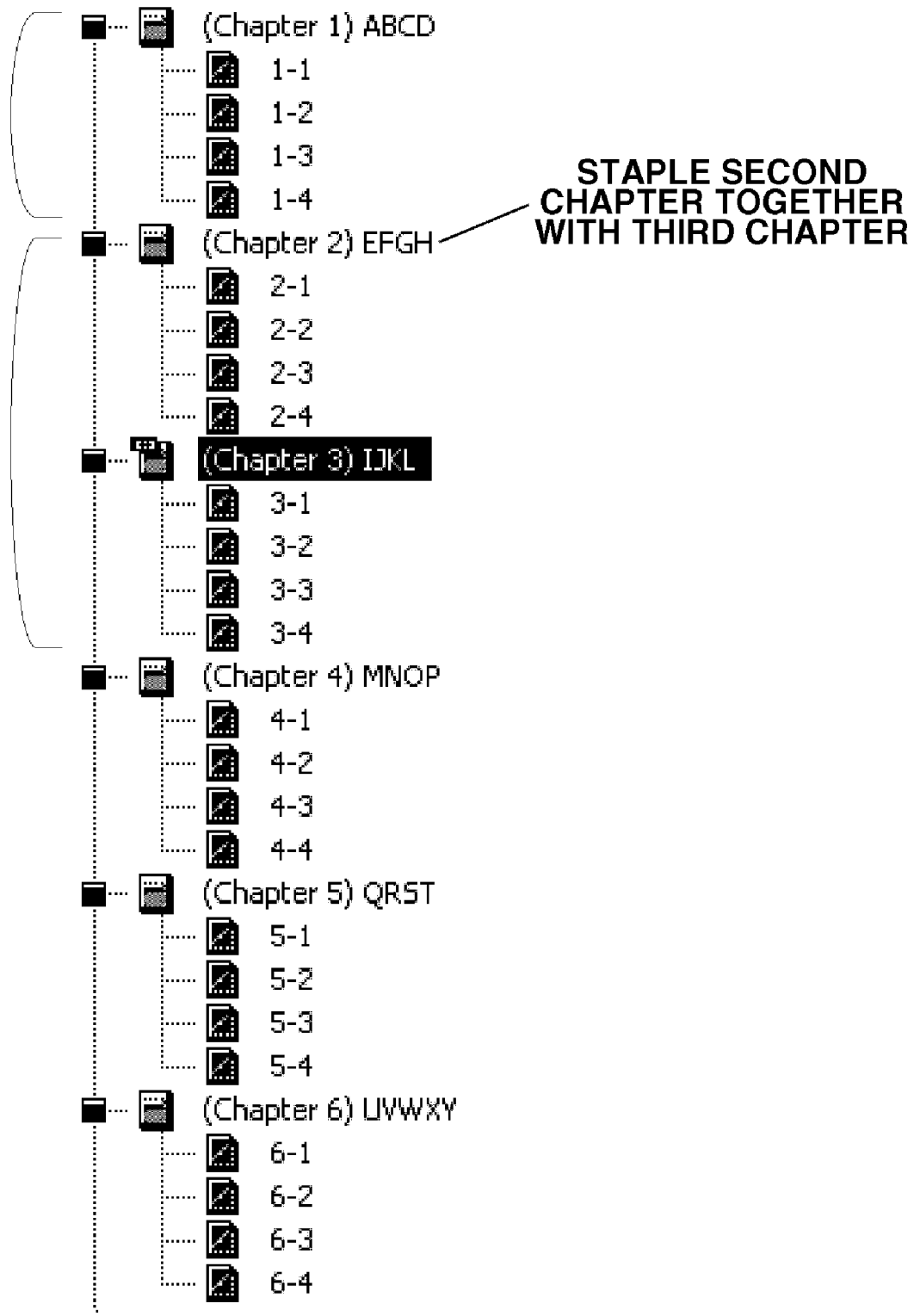
FIG. 24 illustrates an example of a schematic configuration of the tree section extracted from the GUI screen according to an exemplary embodiment of the present invention.
Figure 25:
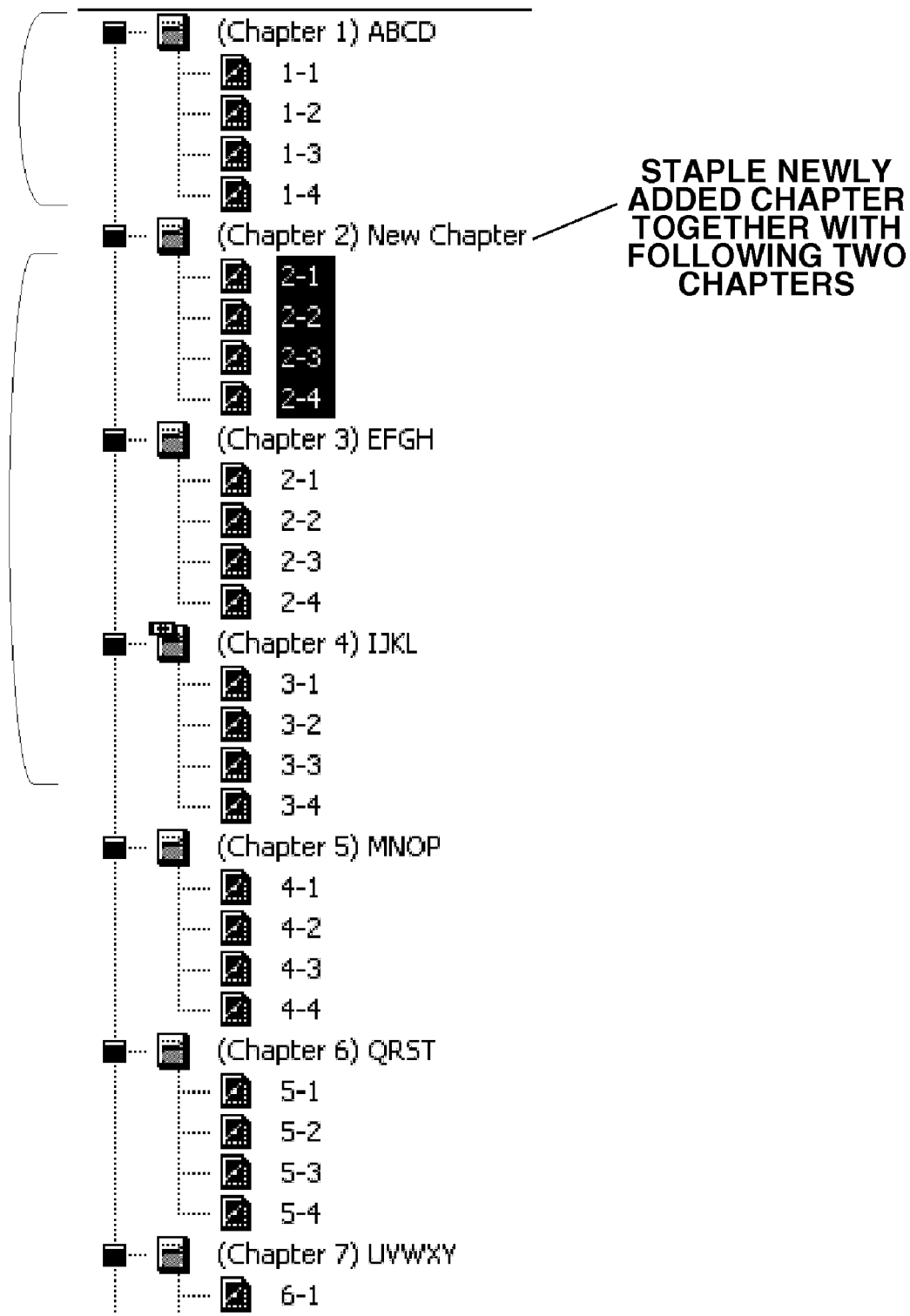
FIG. 25 illustrates an example of a schematic configuration of the tree section extracted from the GUI screen according to an exemplary embodiment of the present invention.

In FIGS. 24 and 25, a parenthesis on the left side indicates a single chapter that is stapled independently or a plurality of chapters that are stapled together. According to an example illustrated in FIG. 24, the second chapter and the third chapter are stapled together as a group.

FIG. 25 illustrates a state where a new chapter is inserted between the first chapter and the second chapter. In this case, the staple attribute 2801 of the former second chapter positioned after the new chapter is the staple ON setting. The staple attribute 2801 of the former third chapter is the staple ON setting. Further, the staple continuation attribute 2802 of the former third chapter is continuous to the preceding chapter.

Accordingly, through the above-described processing of the routine illustrated in FIG. 23, the present exemplary embodiment can set "staple ON" as the staple attribute 2801 for the new chapter and further set the staple continuation attribute 2802 for the new chapter to be not continuous to the preceding chapter. Moreover, the present exemplary embodiment can set the staple continuation attribute 2802 for the third chapter (i.e., the former second chapter) to be continuous to the preceding chapter (i.e., the new chapter). As a result, the second to the fourth chapters can be stapled together as a single document, as illustrated in FIG. 25.

Figure 26:
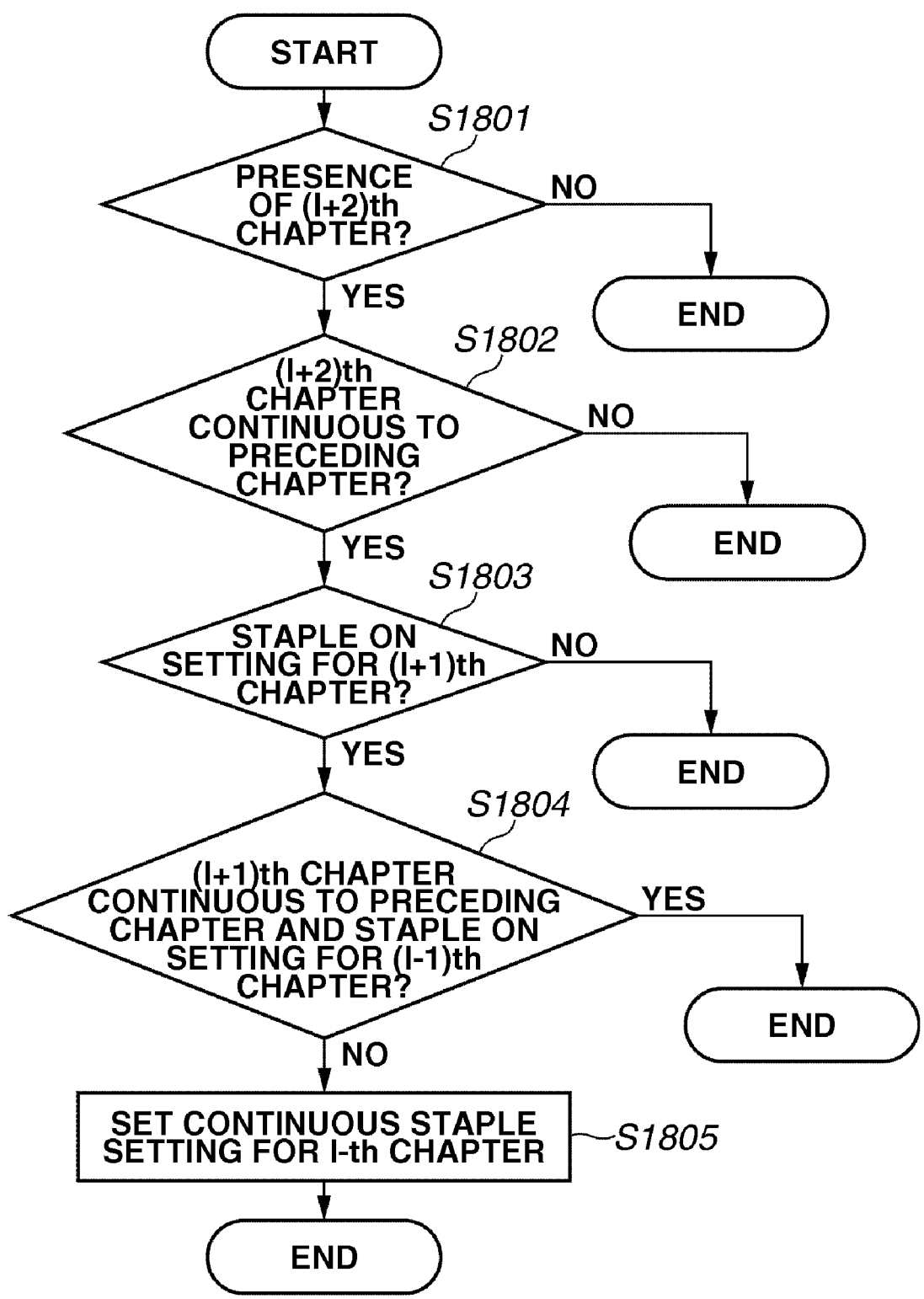
FIG. 26 is a flowchart illustrating an example of staple attribute setting processing to be executed in a case where a chapter following a setting object is set to be stapled together with the following chapter and the setting object is added to a chapter group stapled together according to an exemplary embodiment of the present invention.

FIG. 26 is a flowchart illustrating an example of staple attribute setting processing to be executed in a case where a chapter following a setting object is set to be stapled together with the following chapter and the setting object is added to a chapter group stapled together.

In step S1801, the bookbinding application 104 determines whether two or more chapters that follow the setting object (i.e., the I-th chapter) are present. If the bookbinding application 104 determines that two or more following chapters are present (YES in step S1801), the processing proceeds to step S1802.

If the bookbinding application 104 determines that two or more following chapters are not present (NO in step S1801), the bookbinding application 104 terminates the processing of the routine illustrated in FIG. 26 without determining the staple attribute.

In step S1802, the bookbinding application 104 checks the staple continuation attribute 2802 of the (I+2)th chapter (i.e., the chapter following the I-th chapter but one) and determines whether the staple continuation attribute 2802 of the (I+2)th chapter is the staple ON setting continuous to the preceding chapter (i.e., the (I+1)th chapter following the setting object).

If the bookbinding application 104 determines that the staple continuation attribute 2802 of the (I+2)th chapter is not the staple ON setting continuous to the preceding chapter (i.e., NO in step S1802), the bookbinding application 104 terminates the processing of the routine illustrated in FIG. 26.

If the bookbinding application 104 determines that the staple continuation attribute 2802 of the (I+2)th chapter is the staple ON setting continuous to the preceding chapter (i.e., YES in step S1802), the processing proceeds to step S1803.

In step S1803, the bookbinding application 104 checks the staple attribute 2801 of the (I+1)th chapter that follows the setting object and determines whether the staple attribute 2801 of the (I+1)th chapter is the staple ON setting. If the bookbinding application 104 determines that the staple attribute 2801 of the (I+1)th chapter is not the staple ON setting (NO in step S1803), the bookbinding application 104 terminates the processing of the routine illustrated in FIG. 26. If the bookbinding application 104 determines that the staple attribute 2801 of the (I+1)th chapter is the staple ON setting (YES in step S1803), the processing proceeds to step S1804.

In step S1804, the bookbinding application 104 determines whether the (I+1)th chapter that follows the setting object is set to be stapled together with the preceding chapter and the staple attribute 2801 of the (I−1)th chapter is the staple ON setting.

In other words, the bookbinding application 104 determines whether the I-th chapter is sandwiched between two other chapters in the group staple setting. If the bookbinding application 104 determines that the I-th chapter is not sandwiched between two other chapters in the group staple setting (NO in step S1804), the processing proceeds to step S1805.

If the bookbinding application 104 determines that the I-th chapter is sandwiched between two other chapters in the group staple setting (YES in step S1804), the bookbinding application 104 terminates the processing of the routine illustrated in FIG. 26.

In step S1805, the bookbinding application 104 sets "staple ON" as the staple attribute 2801 of the I-th chapter (i.e., the setting object). Further, the bookbinding application 104 sets staple ON setting as the staple continuation attribute 2802 for the (I+1) chapter to be continuous to the preceding chapter.

Figure 27:
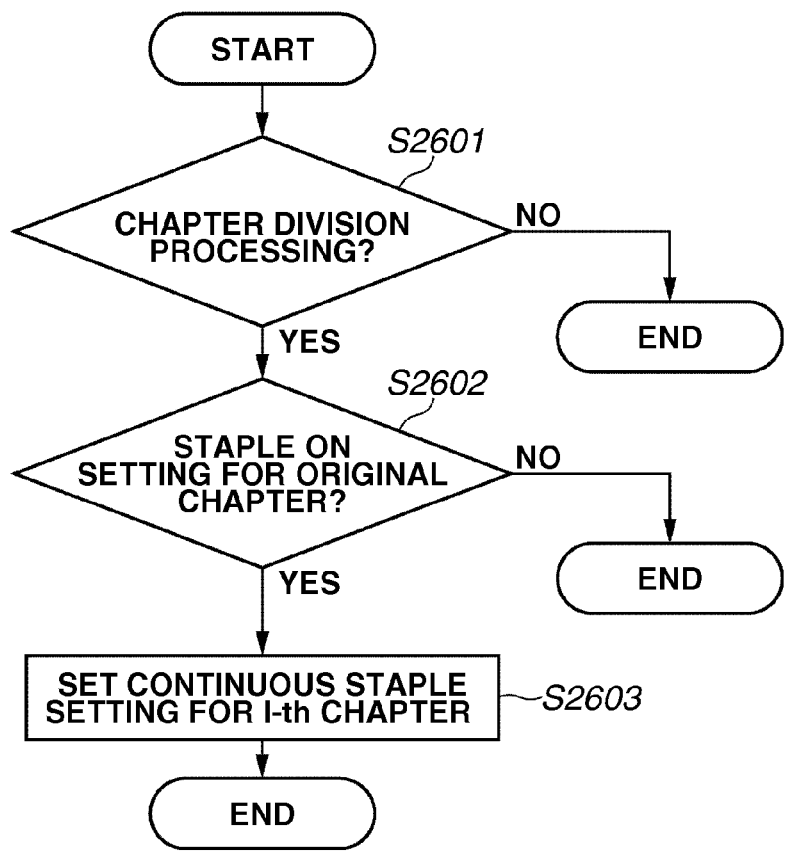
FIG. 27 is a flowchart illustrating an example of processing for determining a staple attribute and a staple continuation attribute in a case where a chapter is divided according to an exemplary embodiment of the present invention.

FIG. 27 is a flowchart illustrating an example of processing for determining the staple attribute 2801 and the staple continuation attribute 2802 in a case where a chapter is divided.

In step S2601, the bookbinding application 104 determines whether the presently executed processing is chapter division processing to generate a chapter. If the bookbinding application 104 determines that the presently executed processing is not the chapter division processing (NO in step S2601), the bookbinding application 104 terminates the processing of the routine illustrated in FIG. 27. If the bookbinding application 104 determines that the presently executed processing is the chapter division processing (YES in step S2601), the processing proceeds to step S2602.

In step S2602, the bookbinding application 104 checks the staple attribute 2801 of an original chapter that was divided and determines whether the staple attribute 2801 of the original chapter is the staple ON setting. If the bookbinding application 104 determines that the staple attribute 2801 of the original chapter is the staple ON setting (YES in step S2602), the processing proceeds to step S2603. If the bookbinding application 104 determines that the staple attribute 2801 of the original chapter is not the staple ON setting (NO in step S2602), the bookbinding application 104 terminates the processing of the routine illustrated in FIG. 27.

In step S2603, the bookbinding application 104 sets "staple ON" as the staple attribute 2801 for a new chapter generated by the division processing. The bookbinding application 104 further sets the staple continuation attribute 2802 for the new chapter to be continuous to the preceding chapter.

Figure 28:
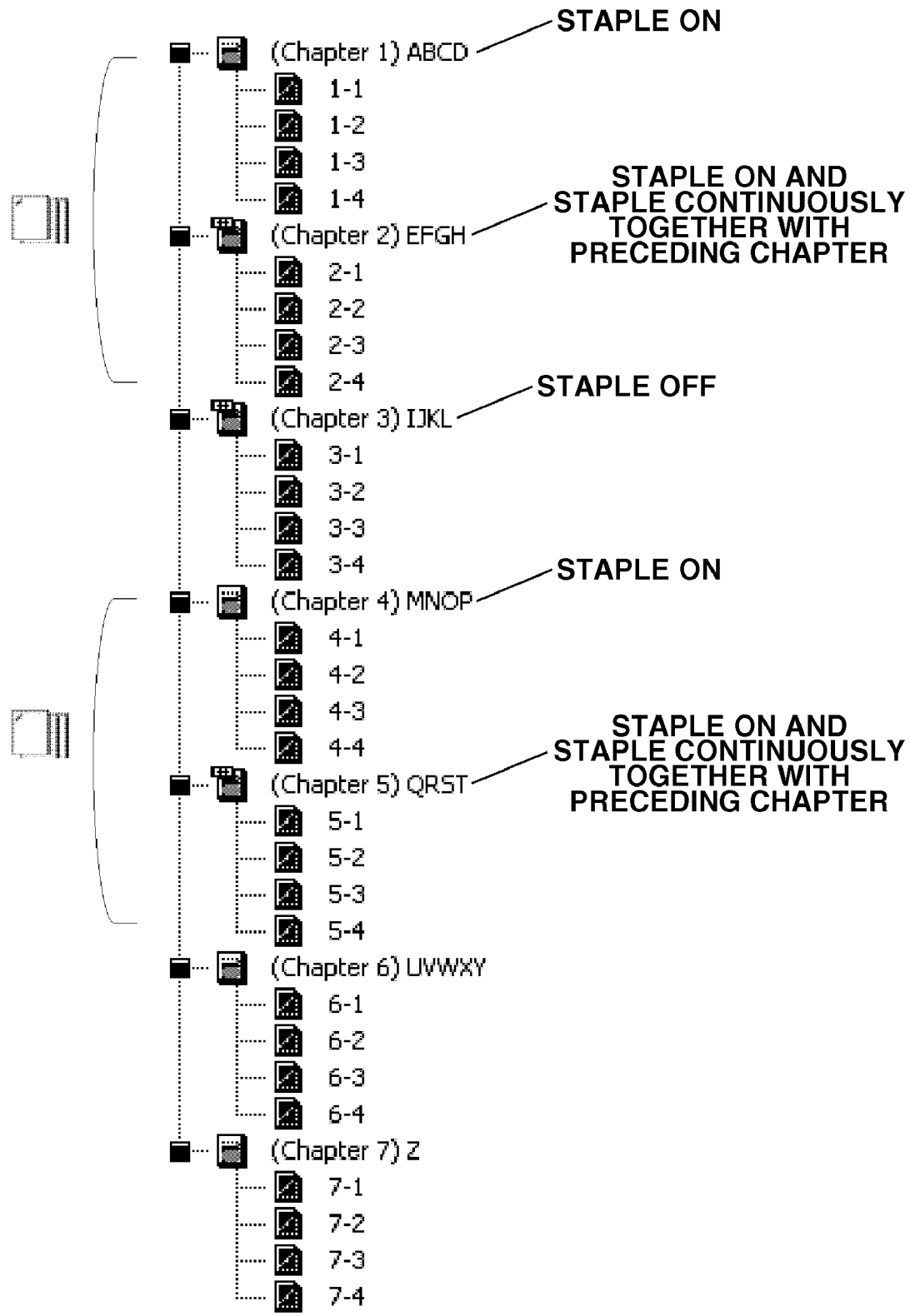
FIG. 28 illustrates an example of the state where no chapter is deleted according to an exemplary embodiment of the present invention.
Figure 29:
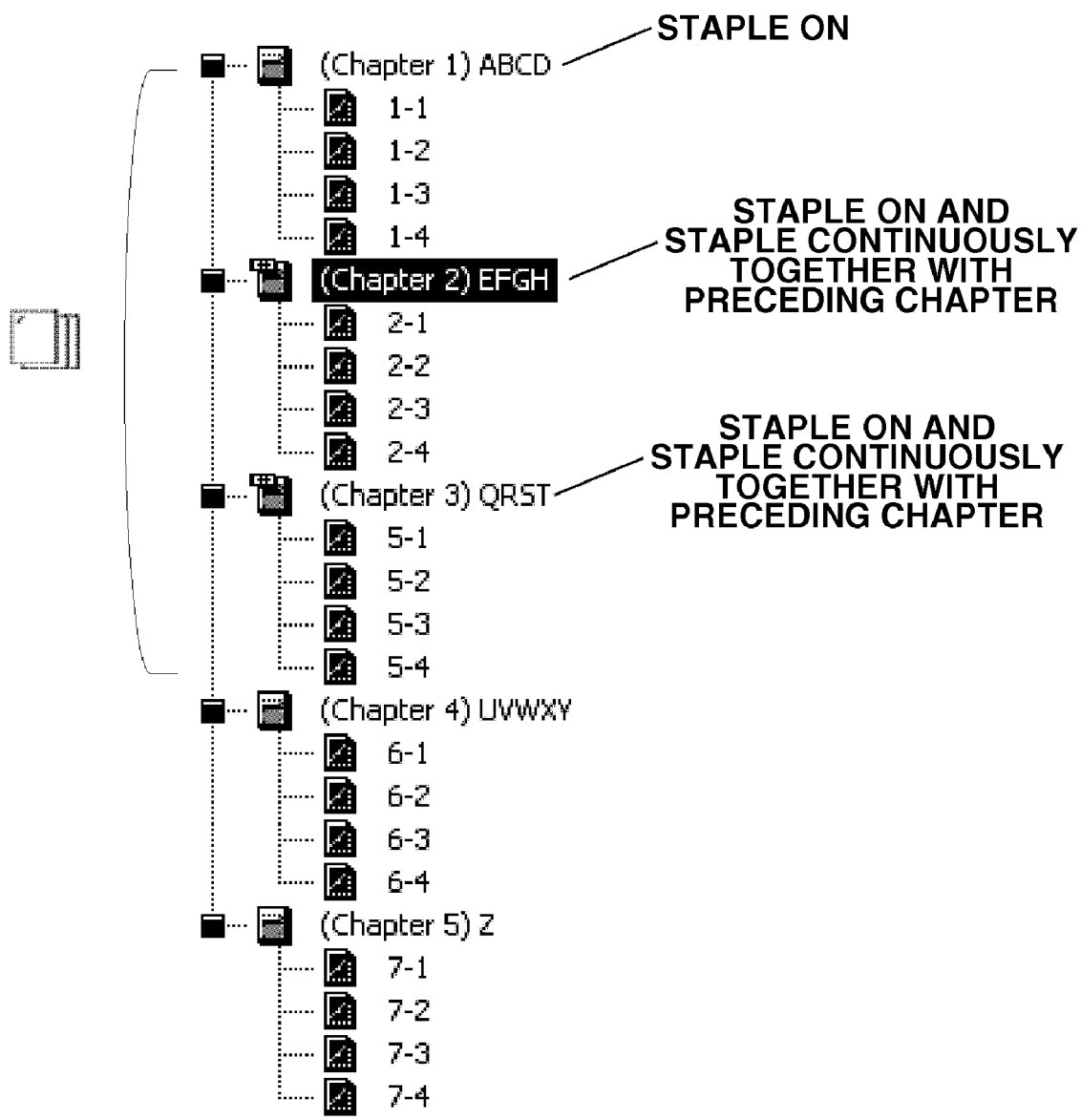
FIG. 29 illustrates an example of another state, which is different from the state illustrated in FIG. 28 in that a third and a fourth chapters are deleted by a user, according to an exemplary embodiment of the present invention.

FIGS. 28 and 29 illustrate problems that may be caused when chapters are deleted. FIG. 28 illustrates a state where no chapter is deleted and the chapter setting information 307 of the first chapter includes the staple ON setting. The chapter setting information 307 of the second chapter includes the staple ON setting. Further, the second chapter is set to be continuously stapled together with the preceding chapter.

The chapter setting information 307 of the third chapter includes the staple OFF setting. The chapter setting information 307 of the fourth chapter includes the staple ON setting. The chapter setting information 307 of the fifth chapter includes the staple ON setting. Further, the fifth chapter is set to be continuously stapled together with the preceding chapter. In this condition, the first chapter and the second chapter are continuously stapled. The third chapter is not stapled together with other chapters. The fourth chapter and the fifth chapter are continuously stapled.

FIG. 29 illustrates an example of another state, which is different from the state illustrated in FIG. 28 in that the third and the fourth chapters are deleted by a user. The chapter setting information 307 of the first chapter includes the staple ON setting. The chapter setting information 307 of the second chapter includes the staple ON setting. Further, the second chapter is set to be continuously stapled together with the preceding chapter. The chapter setting information 307 of the third chapter (i.e., the former fifth chapter) includes the staple ON setting.

The third chapter is set to be continuously stapled together with the preceding chapter. As a result, the first chapter, the second chapter, and the third chapter (i.e., the former fifth chapter) are stapled together as a group. Although the former fifth chapter is separated from the first chapter in the former state illustrated in FIG. 28, the former fifth chapter may be stapled together with the first chapter by deleting the third and fourth chapters.

Figure 30:
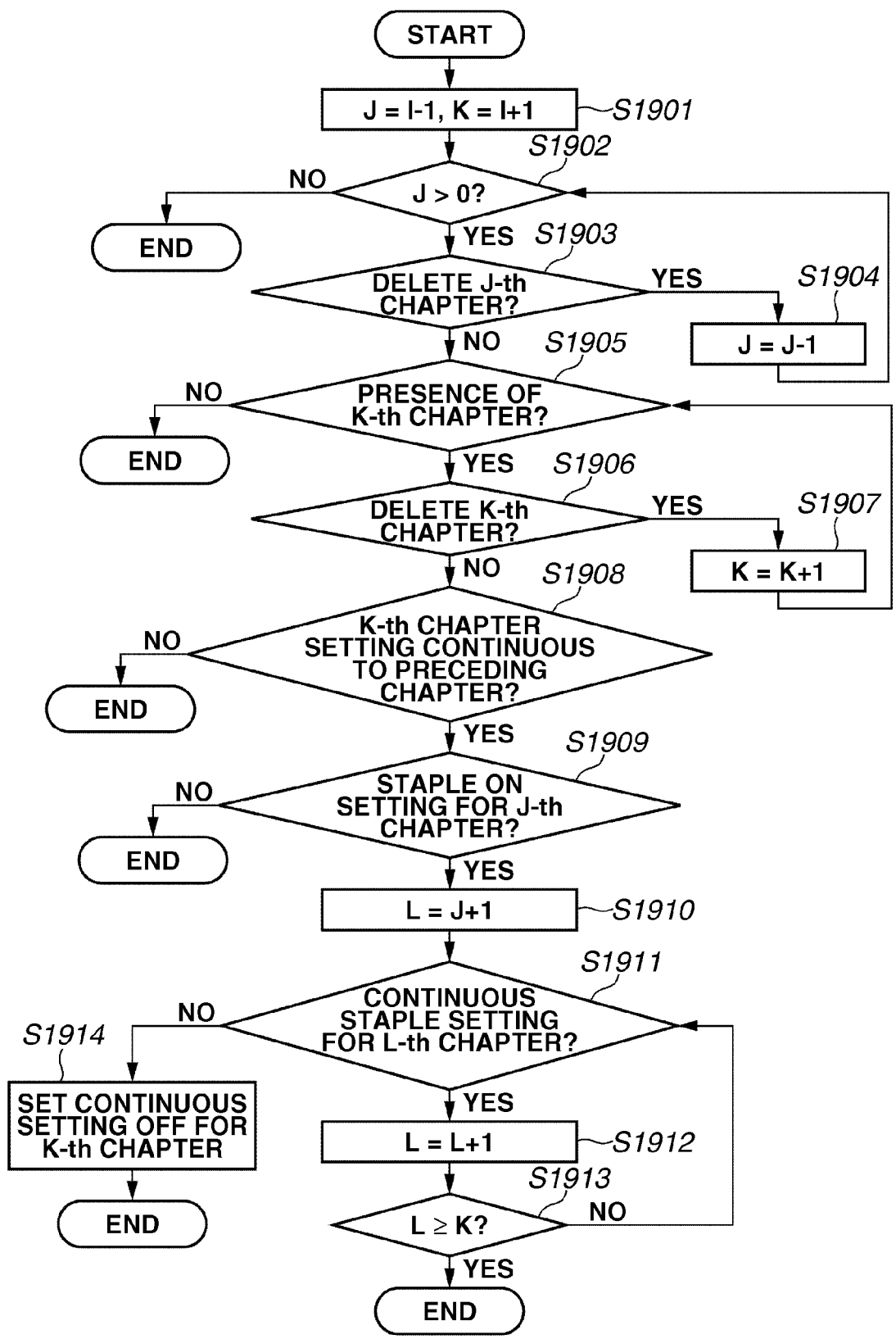
FIG. 30 is a flowchart illustrating an example of processing for deleting a chapter, as an example of processing different from the chapter addition and shifting processing) according to an exemplary embodiment of the present invention.

FIG. 30 is a flowchart illustrating an example of processing for deleting a chapter (i.e., an example of processing different from the chapter addition and shifting processing). In this case, the I-th chapter is a deletion object (i.e., a chapter to be deleted). In step S1901, the bookbinding application 104 initializes the counters J and K to J=I−1 and K=I+1, respectively.

In a processing loop from steps S1902 to S1904, the bookbinding application 104 retroactively checks the total number of preceding chapters to be deleted together with the deletion object (i.e., the I-th chapter).

In step S1902, the bookbinding application 104 determines whether the I-th chapter (i.e., the deletion object) and consecutively following chapters includes the first chapter. If the counter J is greater than 0 (YES in step S1902), the processing proceeds to step S1903. If the counter J is equal to 0 (NO in step S1902), the bookbinding application 104 terminates the processing of the routine illustrated in FIG. 30 because consecutive chapters including the first chapter are deleted and no remaining chapter can be integrated with other chapters.

In step S1903, the bookbinding application 104 determines whether the J-th chapter is to be deleted. If the bookbinding application 104 determines that the J-th chapter is to be deleted (YES in step S1903), then in step S1904, the bookbinding application 104 decrements the counter J by one (i.e., J=J−1). If the bookbinding application 104 determines that the J-th chapter is not the deletion object (NO in step S1903), the processing proceeds to step S1905.

In a processing loop from step S1905 to step S1907, the bookbinding application 104 proactively checks the total number of following chapters to be deleted together with the deletion object (i.e., the I-th chapter).

In step S1905, the bookbinding application 104 determines whether the K-th chapter is present. If the bookbinding application 104 determines that the K-th chapter is not present (NO in step S1905), the bookbinding application 104 terminates the processing of the routine illustrated in FIG. 30 because consecutive chapters from the I-th chapter to the final chapter are deleted and no remaining chapter can be integrated with the preceding chapter.

If the bookbinding application 104 determines that the K-th chapter is present (YES in step S1905), the processing proceeds to step S1906.

In step S1906, the bookbinding application 104 determines whether the K-th chapter is the deletion object. If the bookbinding application 104 determines that the K-th chapter is the deletion object (YES in step S1906), then in S1907, the bookbinding application 104 increments the counter K to check the following chapter. If the bookbinding application 104 determines that the K-th chapter is not the deletion object (NO in step S1906), the bookbinding application 104 determines that a group from the I-th chapter to the (K−1) chapter are the consecutive deletion objects.

In step S1908, the bookbinding application 104 checks the chapter setting information 307 of the K-th chapter and determines whether the staple attribute of the K-th chapter is the staple ON setting and the K-th chapter is stapled together with the preceding chapter.

If the bookbinding application 104 determines that the K-th chapter is not stapled together with the preceding chapter (NO in step S1908), the bookbinding application 104 terminates the processing of the routine illustrated in FIG. 30. If the bookbinding application 104 determines that the staple attribute of the K-th chapter is the staple ON setting and the K-th chapter is stapled together with the preceding chapter (YES in step S1908), the processing proceeds to step S1909.

In step S1909, the bookbinding application 104 checks the chapter setting information 307 of the J-th chapter and determines whether the staple attribute of the J-th chapter is the staple ON setting.

If the bookbinding application 104 determines that the staple attribute of the J-th chapter is not the staple ON setting (NO in step S1909), the bookbinding application 104 terminates the processing of the routine illustrated in FIG. 30.

If the bookbinding application 104 determines that the staple attribute of the J-th chapter is the staple ON setting (YES in step S1909), the processing proceeds to step S1910.

In step S1910, the bookbinding application 104 initializes a new counter L to J+1.

In step S1911, the bookbinding application 104 checks the chapter setting information 307 of the L-th chapter and determines whether the staple attribute of the L-th chapter is the staple ON setting continuous to the preceding chapter. If the bookbinding application 104 determines that the L-th chapter is not the staple ON setting continuous to the preceding chapter (NO in step S1911), the processing proceeds to step S1914.

If the bookbinding application 104 determines that the L-th chapter is the staple ON setting continuous to the preceding chapter (YES in step S1911), the processing proceeds to step S1912.

In step S1912, the bookbinding application 104 increments the counter L by one. In step S1913, the bookbinding application 104 compares L with K. If the bookbinding application 104 determines that L is equal to or greater than K (YES in step S1913), the bookbinding application 104 terminates the processing of the routine illustrated in FIG. 30. If the bookbinding application 104 determines that L is less than K (NO in step S1913), the processing returns to step S1911, in which the bookbinding application 104 checks the next deletion object (chapter).

In step S1914, the bookbinding application 104 changes the chapter setting information 307 of the K-th chapter to be "not continuous to the preceding chapter" as the staple attribute. This is because the staple is interrupted at an intermediate chapter between the I-th chapter and the (K−1) chapter. In other words, the bookbinding application 104 prevents the K-th chapter from being integrated with the (I−1)th chapter.

In the above-described flowcharts according to the present exemplary embodiments, the order of various processing can be arbitrarily changed unless the entire processing becomes incomplete.

The above-described exemplary embodiments can be applied to a system including a plurality of devices (e.g., a host computer, an interface device, a reader, and a printer) or can be applied to a single device or an apparatus (e.g., a copying machine, a printer, a facsimile apparatus). Effects of the above-described exemplary embodiments can be attained by the following features.

For example, a storage medium (or a recording medium) storing a software program code for realizing the above-described exemplary embodiments can be supplied to a system or an apparatus. A computer (or a central processing unit (CPU) or a micro-processing unit (MPU)) in the system or the apparatus can read and execute the program code stored in the storage medium.

In this case, the program code itself read out of the storage medium can realize the functions of the above-described exemplary embodiments. The storage medium storing the program code constitutes an exemplary embodiment of the present invention.

An operating system (OS) or other application software running on a system or an apparatus can read and execute part of all of actual processing read by the system or the central processing unit of the apparatus based on instructions of the programs to realize the functions of the above-described exemplary embodiments.

Additionally, the program code read out of a storage medium can be written into a memory of a function expansion card inserted in the system or the apparatus or into a memory of a function expansion unit connected to the system or the apparatus. In this case, based on instructions of the program, a CPU provided on the function expansion card or the function expansion unit can execute part or all of actual processing to realize the functions of the above-described exemplary embodiments.

When the exemplary embodiments of the present embodiment are applied to the storage medium, the storage medium (i.e., a computer-readable storage medium) stores program codes corresponding to the above-described flowcharts.

At least one of the above-described exemplary embodiments can set a continuous staple attribute that instructs a group staple of consecutive chapters. Further, at least one of the above-described exemplary embodiments can staple a plurality of chapters together according to a continuous staple attribute for stapling a chapter together with at least a preceding chapter.

Further, if the instruction is a continuous staple instruction that instructs integrating a setting object with a neighboring chapter, and if the instructed chapter is an initial chapter of the document, the continuous staple instruction can be disregarded.

Further, in a case where the instruction is a continuous staple instruction that instructs integrating a setting object with a preceding chapter node, and if the preceding chapter is not a staple object of the document, the continuous staple instruction can be disregarded.

Further, if a new chapter is generated between two or more chapters stapled together as a group, the new chapter can be stapled together with the plurality of chapters as a group in the following manner. In short, at least one of the above-described exemplary embodiments can instruct a continuous staple ON setting as a partial staple attribute of the plurality of chapters stapled together and as a partial staple attribute of the new chapter.

Further, if a new chapter is generated at a position adjacent to a plurality of chapters stapled together as a group, the new chapter can be stapled together with the plurality of chapters as a group in the following manner. In short, at least one of the above-described exemplary embodiments can instruct a continuous staple ON setting as a partial staple attribute of the plurality of chapters stapled together and as a partial staple attribute of the new chapter.

Further, if the partial staple setting of chapters that precede and follow a new chapter is not the continuous staple ON setting, and if the partial staple setting of the chapters that precede and follow the new chapter is identical to each other, the staple attribute of the new chapter can be set to be identical to the staple attribute of the partial staple setting of the chapters that precede and follow the new chapter.

Further, in a case where a new chapter is generated by dividing an existing chapter of a document, and if the staple ON setting is set for the original chapter having been divided, the new chapter can be stapled together with the divided chapter in the following manner. In short, the staple attribute of the new chapter can be changed to the continuous staple setting.

Further, in a case where a chapter existing in a document is deleted, if a chapter that precedes the deletion object and a chapter that follows the deletion object are not in the same staple range, at least one of the above-described exemplary embodiments can determine whether the chapter that precedes the deletion object and the chapter that follows the deletion object are present in the same staple range.

Then, if the chapter that precedes the deletion object and the chapter that follows the deletion object are not present in the same staple range, at least one of the above-described exemplary embodiments can change the staple attribute of the chapter that follows the deletion object to the continuous staple OFF setting if necessary.

As described above, the exemplary embodiments of the present invention can promptly set a staple attribute that instructs a printing apparatus to staple consecutive chapters as a group.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-274891 filed Oct. 24, 2008, which is hereby incorporated by reference herein in its entirety.

What is claimed is:

1. An information processing apparatus comprising:
an attribute setting unit configured to set a continuous staple attribute as chapter information of document data having a hierarchical structure that includes document information, chapter information, and page information, based on a user's setting entered via a screen,
wherein the continuous staple attribute is set to instruct a printing apparatus to staple consecutive chapters together as a group; and
wherein the attribute setting unit sets the continuous staple attribute, which is set to instruct the printing apparatus to staple an object chapter and a chapter that is continuous to and precedes the object chapter together as a group, as the chapter information of the object chapter as well as the chapter information of the preceding chapter.

2. The information processing apparatus according to claim 1, wherein the attribute setting unit determines whether the preceding chapter is an initial chapter of a document and, if it is determined that the preceding chapter is not the initial chapter of the document, the attribute setting unit sets the continuous staple attribute as the chapter information of the object chapter as well as the chapter information of the preceding chapter.

3. The information processing apparatus according to claim 1, wherein the attribute setting unit determines whether the preceding chapter is a staple object and, if it is determined that the preceding chapter is the staple object, the attribute setting unit sets the continuous staple attribute as the chapter information of the object chapter as well as the chapter information of the preceding chapter.

4. An information processing apparatus, comprising:
an attribute setting unit configured to set a continuous staple attribute as chapter information of document data having a hierarchical structure that includes document information, chapter information, and page information, based on a user's setting entered via a screen,
wherein the continuous staple attribute is set to instruct a printing apparatus to staple consecutive chapters together as a group; and
wherein in a case where a new chapter is generated between a plurality of chapters that are stapled together as a group, the attribute setting unit sets the continuous staple attribute as the chapter information of the plurality of chapters as well as the chapter information of the new chapter so that the plurality of chapters and the new chapter can be stapled together as a group.

5. An information processing apparatus comprising:
an attribute setting unit configured to set a continuous staple attribute as chapter information of document data having a hierarchical structure that includes document information, chapter information, and page information, based on a user's setting entered via a screen,
wherein the continuous staple attribute is set to instruct a printing apparatus to staple consecutive chapters together as a group; and
wherein in a case where a new chapter is generated at a position continuous to a plurality of chapters that are stapled together as a group, the attribute setting unit sets the continuous staple attribute as the chapter information of the new chapter and sets the continuous staple attribute as the chapter information of a chapter following the new chapter so that the plurality of chapters and the new chapter can be stapled together as a group.

6. An information processing apparatus comprising:
an attribute setting unit configured to, in a case where a new chapter is generated and added to existing document data having a hierarchical structure that includes document information, chapter information, and page information, determine whether settings of the chapter information of chapters preceding and following the newly added chapter are not a continuous staple attribute that instructs a printing apparatus to staple consecutive chapters together as a group and whether a same attribute is set as the chapter information of the preceding and following chapters, and to set an attribute of the chapter information for the new chapter to be identical to that of the chapter information for the preceding and following chapters if it is determined that the settings of the preceding and following chapters are not the continuous staple attribute and the same attribute is set as the chapter information of the preceding and following chapters.

7. An information processing apparatus comprising:
an attribute setting unit configured to, in a case where a chapter is deleted from existing document data having a hierarchical structure that includes document information, chapter information, and page information, determine whether a continuous staple attribute that instructs a printing apparatus to staple consecutive chapters together as a group is set for a chapter following the chapter to be deleted, whether a continuous staple attribute identical to the continuous staple attribute is not set as the chapter information of a chapter preceding the chapter to be deleted, and whether, after the chapter to be deleted is deleted, the chapter preceding the chapter to be deleted and the chapter following the chapter to be deleted are not in a same range to be stapled together as a group, and if it is determined that the continuous staple attribute is set for the chapter following the chapter to be deleted, the continuous staple attribute identical to the continuous staple attribute is not set as the chapter information of the chapter preceding the chapter to be deleted, and, after the chapter to be deleted is deleted, the chapter preceding the chapter to be deleted and the chapter following the chapter to be deleted are not in the same range to be stapled together as a group, to change the continuous staple attribute set as the chapter information for the chapter to be deleted to a staple attribute that instructs the printing apparatus to staple the consecutive chapters.

8. A staple attribute setting method for an information processing apparatus, the staple attribute setting method comprising:
in a case where a new chapter is generated and added to existing document data having a hierarchical structure that includes document information, chapter information, and page information, determining whether settings of the chapter information of chapters preceding and following the newly added chapter are not a continuous staple attribute that instructs a printing apparatus to staple consecutive chapters together as a group and whether a same attribute is set as the chapter information of the preceding and following chapters, and setting an attribute of the chapter information for the new chapter to be identical to that of the chapter information for the preceding and following chapters if it is determined that the settings of the preceding and following chapters are not the continuous staple attribute and the same attribute is set as the chapter information of the preceding and following chapters.

9. A staple attribute setting method for an information processing apparatus, the staple attribute setting method comprising:
in a case where a chapter is deleted from existing document data having a hierarchical structure that includes document information, chapter information, and page information, determining whether a continuous staple attribute that instructs a printing apparatus to staple consecutive chapters together as a group is set for a chapter following the chapter to be deleted, whether a continuous staple attribute identical to the continuous staple attribute is not set as the chapter information of a chapter preceding the chapter to be deleted, and whether, after the chapter to be deleted is deleted, the chapter preceding the chapter to be deleted and the chapter following the chapter to be deleted are not in a same range to be stapled together as a group, and if it is determined that the continuous staple attribute is set for the chapter following the chapter to be deleted, the continuous staple attribute identical to the continuous staple attribute is not set as the chapter information of the chapter preceding the chapter to be deleted, and, after the chapter to be deleted is deleted, the chapter preceding the chapter to be deleted and the chapter following the chapter to be deleted are not in the same range to be stapled together as a group, changing the continuous staple attribute set as the chapter information for the chapter to be deleted to a staple attribute that instructs the printing apparatus to staple the consecutive chapters.

10. A non-transitory computer-readable storage medium storing a program for causing a computer to function as an attribute setting unit configured to:
in a case where a new chapter is generated and added to existing document data having a hierarchical structure that includes document information, chapter information, and page information, determine whether settings of the chapter information of chapters preceding and following the newly added chapter are not a continuous staple attribute that instructs a printing apparatus to staple consecutive chapters together as a group and whether a same attribute is set as the chapter information of the preceding and following chapters, and to set an attribute of the chapter information for the new chapter to be identical to that of the chapter information for the preceding and following chapters if it is determined that the settings of the preceding and following chapters are not the continuous staple attribute and the same attribute is set as the chapter information of the preceding and following chapters.

11. A non-transitory computer-readable storage medium storing a program for causing a computer to function as an attribute setting unit configured to:
in a case where a chapter is deleted from existing document data having a hierarchical structure that includes document information, chapter information, and page information, determine whether a continuous staple attribute that instructs a printing apparatus to staple consecutive chapters together as a group is set for a chapter following the chapter to be deleted, whether a continuous staple attribute identical to the continuous staple attribute is not set as the chapter information of a chapter preceding the chapter to be deleted, and whether, after the chapter to be deleted is deleted, the chapter preceding the chapter to be deleted and the chapter following the chapter to be deleted are not in a same range to be stapled together as a group, and if it is determined that the continuous staple attribute is set for the chapter following the chapter to be deleted, the continuous staple attribute identical to the continuous staple attribute is not set as the chapter information of the chapter preceding the chapter to be deleted, and, after the chapter to be deleted is deleted, the chapter preceding the chapter to be deleted and the chapter following the chapter to be deleted are not in the same range to be stapled together as a group, to change the continuous staple attribute set as the chapter information for the chapter to be deleted to a staple attribute that instructs the printing apparatus to staple the consecutive chapters.

* * * * *